(12) United States Patent
Monteer

(10) Patent No.: US 9,079,380 B2
(45) Date of Patent: Jul. 14, 2015

(54) TRIM COMPONENTS FOR LAPBOARD SIDING THAT ARE CO-EXTRUDED FROM WOOD-PLASTIC COMPOSITES AND POLYVINYL CHLORIDE

(76) Inventor: Shaun Robert Monteer, Eagle Mountain, UT (US)

( * ) Notice: Subject to any disclaimer, the term of this patent is extended or adjusted under 35 U.S.C. 154(b) by 310 days.

(21) Appl. No.: 13/581,466

(22) PCT Filed: Feb. 25, 2011

(86) PCT No.: PCT/US2011/000344
§ 371 (c)(1),
(2), (4) Date: Aug. 27, 2012

(87) PCT Pub. No.: WO2011/106095
PCT Pub. Date: Sep. 1, 2011

(65) Prior Publication Data
US 2012/0328823 A1    Dec. 27, 2012

Related U.S. Application Data

(60) Provisional application No. 61/338,863, filed on Feb. 25, 2010.

(51) Int. Cl.
*B32B 21/02* (2006.01)
*B32B 21/08* (2006.01)
*B32B 27/30* (2006.01)
*E04F 13/18* (2006.01)
*E04F 19/02* (2006.01)

(52) U.S. Cl.
CPC ................. *B32B 21/02* (2013.01); *B32B 21/08* (2013.01); *B32B 27/30* (2013.01); *E04F 13/18* (2013.01); *E04F 19/024* (2013.01); *Y10T 428/24* (2015.01); *Y10T 428/24008* (2015.01)

(58) Field of Classification Search
CPC ........ B32B 21/02; B32B 21/08; B32B 27/30; E04F 19/024; E04F 13/18; Y10T 428/24008; Y20T 428/24
USPC ............................................... 428/99, 98, 326
See application file for complete search history.

(56) References Cited

U.S. PATENT DOCUMENTS 6,682,814 B2 * 1/2004 Hendrickson et al. ........ 428/326

\* cited by examiner

*Primary Examiner* — Brent O'Hern
(74) *Attorney, Agent, or Firm* — Angus C. Fox, III

(57) ABSTRACT

A lapboard siding and trim system is provided in which trim siding components for board-and-batten siding and associated trim components are manufactured using a co-extrusion process, whereby wood/thermoplastic resin composite material and polyvinyl chloride thermoplastic resins are co-extruded through a single die assembly, thereby producing a trim piece having a plastic composite component, that will be visible following installation, fused under heat and pressure to the polyvinyl chloride standoff and attachment fins, that will be hidden following installation. Also provided is a lapboard siding and trim system in which siding components for clapboard siding are manufactured by extruding wood/thermoplastic resin composite material through a die. Associated trim components are manufactured using the co-extrusion process described above. The siding and trim components are completely waterproof, and installation proceeds with almost no face nailing and almost no caulk.

13 Claims, 37 Drawing Sheets

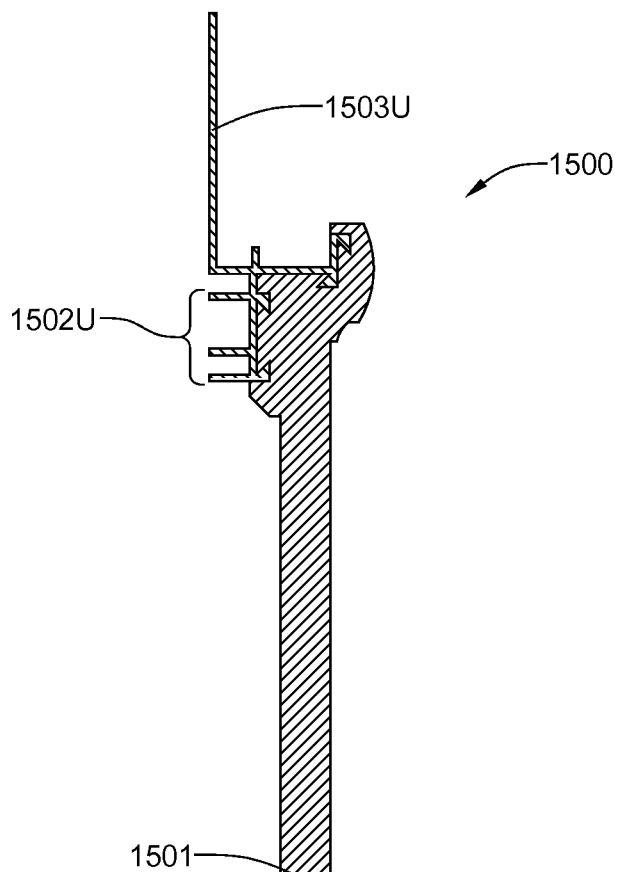
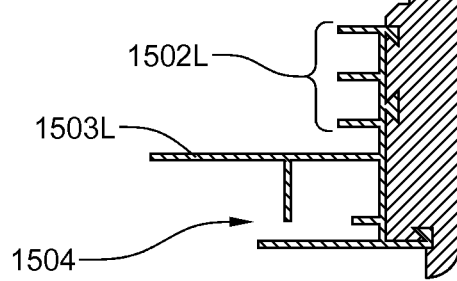
FIG. 16

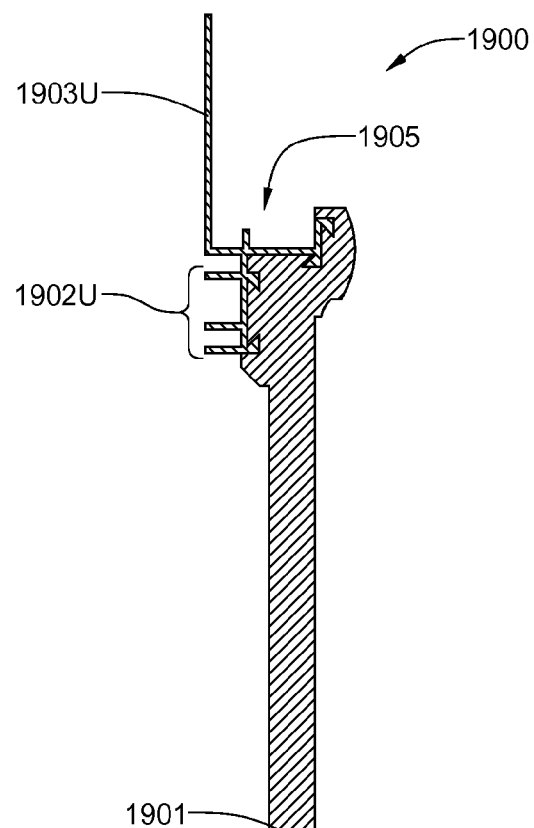
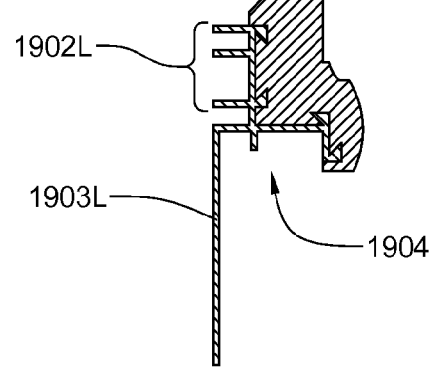
FIG. 20

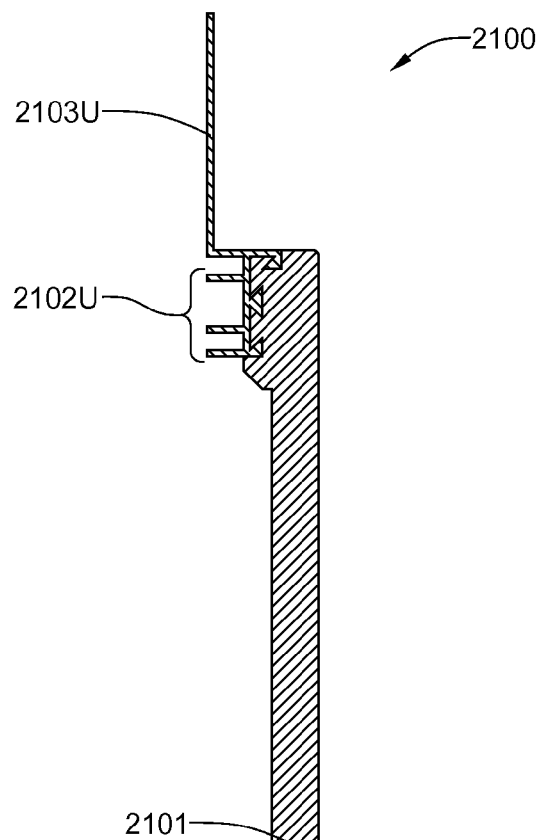
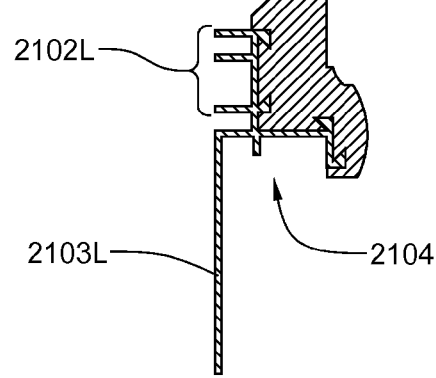
FIG. 22

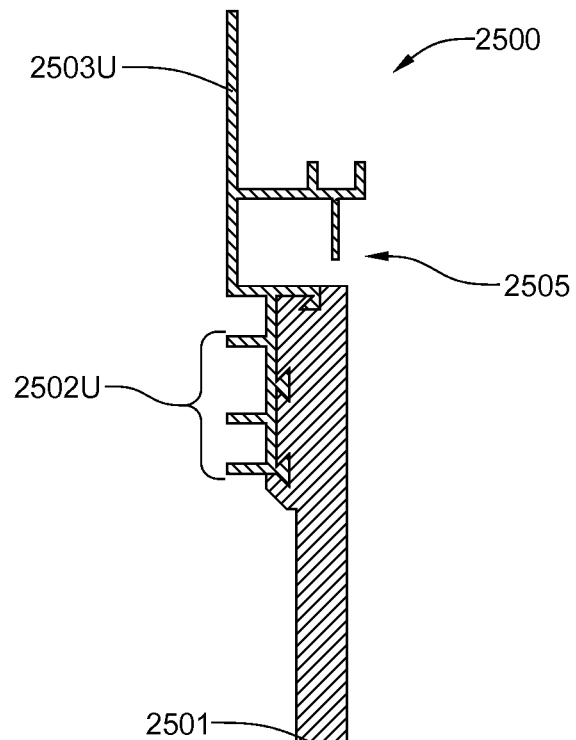
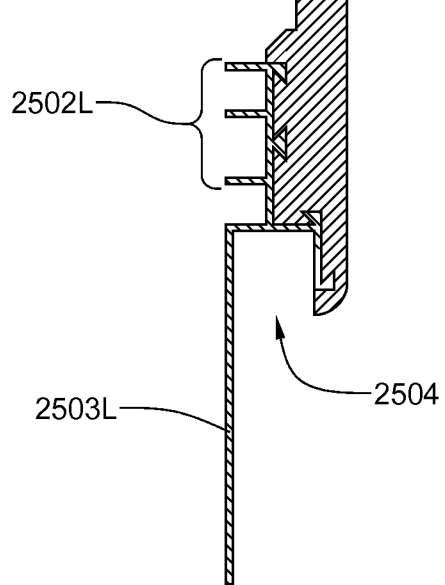
FIG. 26

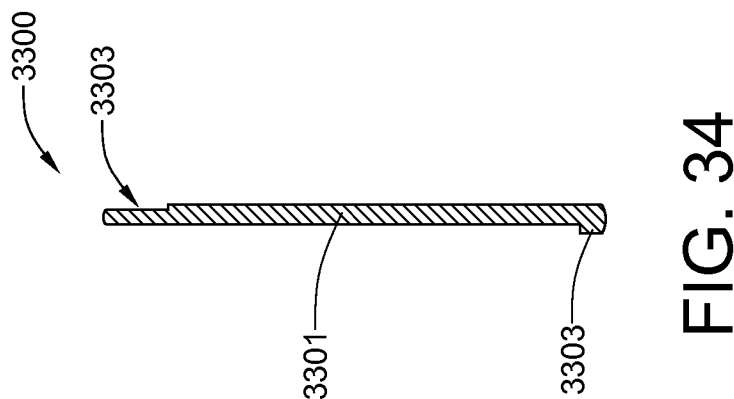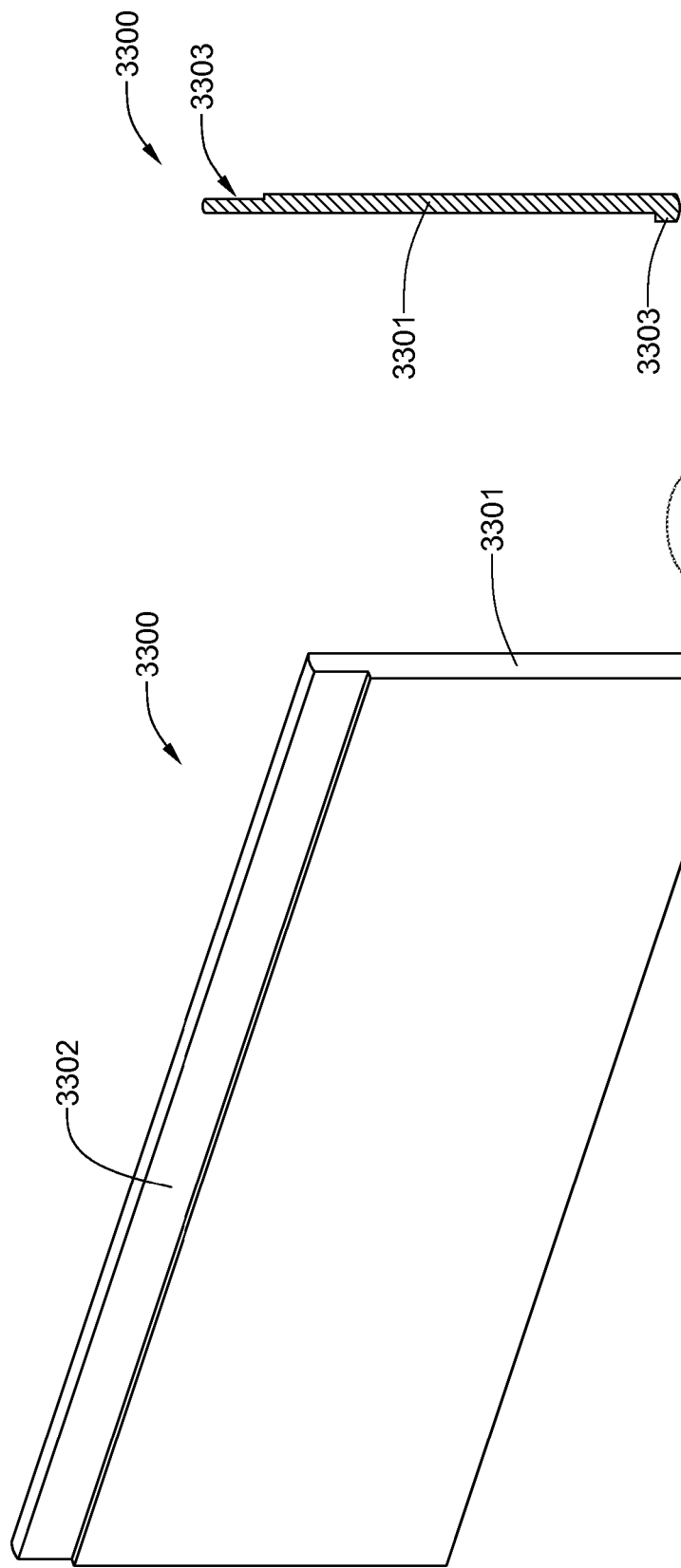

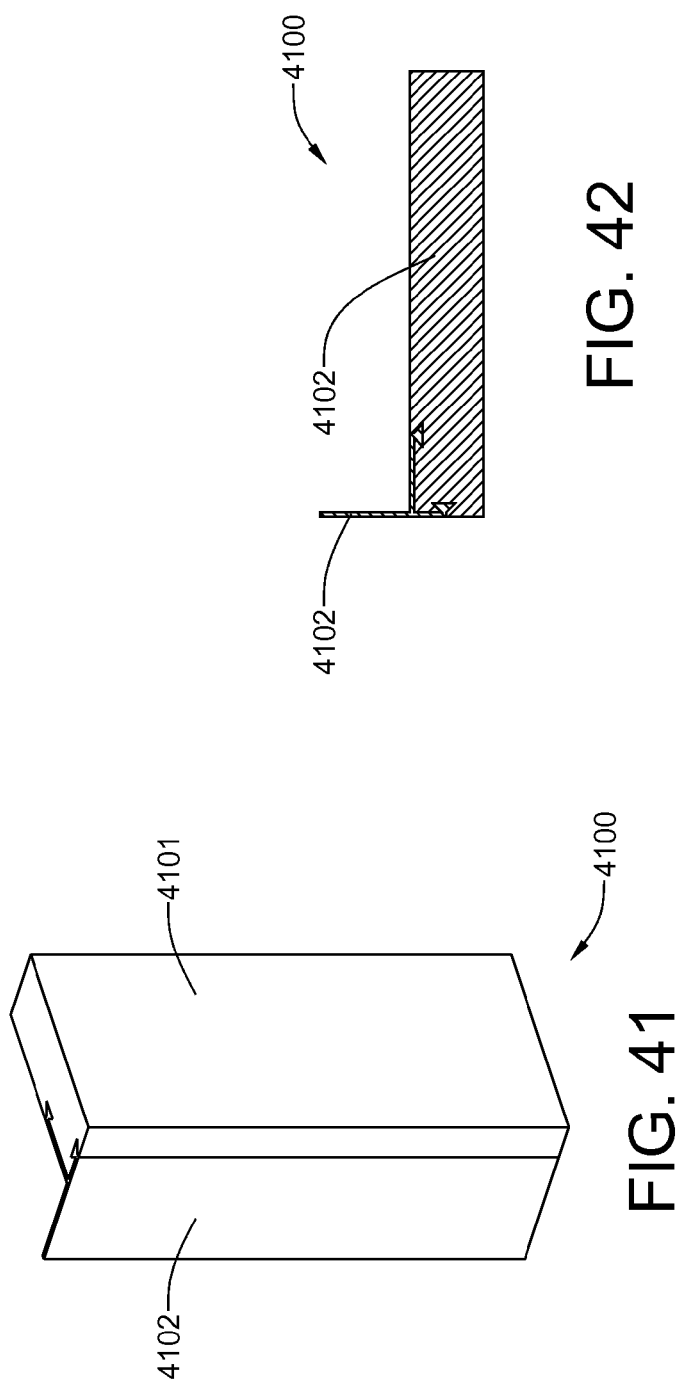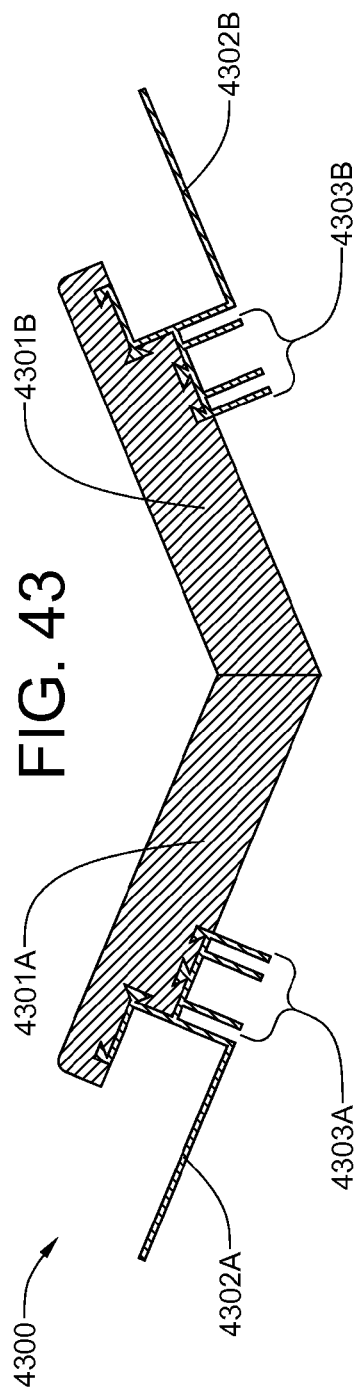

TRIM COMPONENTS FOR LAPBOARD SIDING THAT ARE CO-EXTRUDED FROM WOOD-PLASTIC COMPOSITES AND POLYVINYL CHLORIDE

This application has a priority date based on the filing by the same inventor of a U.S. Provisional Patent Application No. 61/338,863 on Feb. 25, 2010 titled Co-X Trim Systems.

BACKGROUND OF THE INVENTION

1. Field of the Invention

This invention relates, generally, to trim components for lapboard siding systems used on the exteriors of residential and commercial buildings. More particularly, it relates to trim pieces that are co-extruded from wood-plastic composites and polyvinyl chloride.

2. Description of the Prior Art

Clapboard siding is a type of lapboard siding made from boards which have one edge thicker than the other, and which are designed to be applied to the exterior of a frame structure in a horizontal format where each board—other than the bottom board—overlaps an immediately adjacent board below. Clapboard siding, which has a very distinctive and aesthetically pleasing appearance, is most commonly associated with frame homes built in the New England region of the United States. In Australia and New Zealand, this type of siding is known as weatherboard, and was extensively used in forested regions from the Colonial period to the mid-20th Century. In other venues, it is referred to as bevel or lap siding.

The individual boards used for clapboard siding are known as clapboards. Historically, clapboards were made by radially splitting a log about its longitudinal axis. In fact, the word "clapboard" comes from the Dutch infinitive klappen, which means "to split." As more sophisticated equipment became available, clap boards were made by turning a log on a large lathe to a uniform diameter and, then, radially sawing it.

When clapboards are applied as siding, they are layered like shingles and nailed to an underlying frame structure of the building, with the thin side of each clapboard lying under the thick edge of the clapboard on top. Gravity and the overlapping design of the siding protected the underlying structure from the weather by encouraging rain and snow to run down the outside of the structure to the ground, rather than penetrate the siding where it could cause rot and decay. In addition, the overlapping design also allowed the individual clapboards to expand and contract with changes in humidity and temperature. Clapboards may be left unfinished, or they may be painted to accommodate personal taste. Over the years, many types of timber have been used to make clapboard siding. Though natural weather-resistant and pest-resistant qualities have made red cedar a popular choice for centuries, other soft and hard woods can be used as well.

Due to the increasing scarcity of large-diameter, old-growth timber, the rapidly-escalating cost of lumber, and concerns about the ethics of using large amounts of wood for building construction, clapboards today are increasingly made of materials other than sawn timber. Clapboards may be made of fiberglass-reinforced concrete, cementitious materials, water-resistant medium-density fibreboard (MDF), or composites of wood fibers and thermoplastic resins. Many of these materials have greater durability and longevity than wood, making them a better choice for harsh climates. As these clapboards made from manmade materials have imitation wood-grain texture, once they are installed and painted, they are difficult to distinguish from clapboard siding made from sawn lumber. The appearance of clapboard siding can also be achieved using formed laminar sheets of aluminum or polyvinyl chloride. Though nowhere near as durable as solid clapboards and trim made from other manmade materials, formed sheet siding has a definite cost advantage over their solid counterparts. The disadvantages to formed sheet siding are a significantly-reduced appearance of authenticity when viewed up close, greatly reduced durability and—at least with respect to vinyl siding—greatly reduced adhesion of paint. In spite of these disadvantages, aluminum and metal siding is used extensively on starter homes and on other structures where minimization of cost is a priority. Indeed, it is probably true that the popularity of aluminum and vinyl siding for low-end structures has diluted the appeal of well-executed clapboard designs.

Board-and-batten siding is another popular type of lapboard siding. With a board-and-batten siding system, boards are installed in a vertical, abutting format, and the joints between adjacent boards are covered with narrower, secondary boards called battens. The same manmade materials used to manufacture modern clapboards can be used to manufacture the boards and battens used in board-and-batten siding systems. More importantly, at least in the context of the present invention, is the fact that the same trim components can be used for either clapboard siding or board-and-batten siding. Trim components include door and window framing elements, inside and outside corner elements, aprons, frieze boards, gable frieze boards, soffit and fascia components, and other components that are used to hide cut ends of the lap siding boards, frame various types of openings, and provide specialized visual effects. Though not considered lapboard siding, large-panel siding can also be used with the trim components of the present invention. Panels for these types of systems are typically manufactured in three standard sizes: 4 ft. by 8 ft. (1219 mm×2438 mm), 4 ft. by 10 ft. (1219 mm×3048 mm) and 4 ft. by 12 ft. (1219 mm×3657 mm) plywood or waferboard sheets that are generally about 11 mm thick, and are typically engraved with vertical grooves to give the appearance of individual abutting wood slats. The panels typically have tongue and groove edges, which fit together and form a joint having the appearance of one of the many engraved vertical grooves in the panels. Such siding is typically used to reduce labor and material costs for basic, low-end, utilitarian housing. Porta-Camp® frame housing units, mobile homes, and modular homes are notorious for this type of siding.

For conventional lapboard siding systems, including clapboard, as well as board-and-batten siding systems, the siding is applied directly to the exterior of a frame structure, which has been covered, first, with plywood or waferboard sheathing and then, with a water-impermeable or water-resistant membrane (hereinafter "weather barrier") such as tar paper, plastic-coated paper, or a polymeric film. Typically, there is no spacing between the siding boards and the weather barrier. With clapboard siding, the top edge of each horizontally-disposed clapboard is in contact with the weather barrier, thereby creating cavities of triangular cross section along the length of each board. Once paint has been applied to the siding, these cavities may become partially sealed from the exterior. With board-and-batten siding systems, the entire rear surface of each of the vertically-disposed boards is in contact with the weather barrier. Large panel siding provides unique opportunities for cost cutting, as each siding panel also functions as a sheer panel, thereby enabling a builder to completely forego the use of underlying sheathing. In essence, the panels are both the sheathing and the siding, and are typically either nailed or stapled directly to the framing, which has been wrapped with a weather barrier. This method of construction is about as cheap as it gets. As a general rule, the only time that flashing is used to deflect water from the structure is when the siding meets a lower horizontal trim piece. The flashing is typically nailed to the sheathing beneath the siding and extends over the trim piece with a downward bent edge piece so that water cannot pool and enter the joint between the siding and the trim piece.

In spite of the benefits and inherent attractiveness of conventional lapboard siding systems, there are a number of problems associated with those systems. Some of the problems are merely cosmetic; others can affect the structural integrity and longevity of the structure to which the siding is applied; still others have both cosmetic and structural implications.

Likely the most significant problem associated with conventional siding systems, and with conventional lapboard siding systems, in particular, is the passage of water through the joints in the siding. Even though the siding is designed for water runoff, wind can easily drive water uphill, as well as drive it horizontally to vertical a joint. In board-and-batten siding systems, the water can wicks between the siding and the weather barrier. In clapboard siding systems, water can collect in partially-sealed cavities above the clapboards. Unfortunately, the weather barrier is never waterproof because the attachment of the siding mandates that the barrier be perforated by thousands screws, staples, or nails. Every perforation is a potential leakage point to the underlying sheathing. Furthermore, vertical overlapping seams of the weather barrier material are seldom sealed. Thus, water that wicks between the siding and the weather barrier can also wick between the overlapping seams to the underlying sheathing. Once the water has wicked to the outer surface of the sheathing, which is, almost invariably, a wood-based product, it has no way of quickly escaping or evaporating, so it is gradually absorbed by the wood component of the sheathing. Absorption of water by the sheathing sets the stage for rot and decay of that material. Rot and decay can be accelerated by mold growth. Worse, yet, is the reality that moist lumber attracts termites and carpenter ants. Colonies of these pests can destroy the structure of a frame building in short order. Over time, structural damage to the stud framing beneath the sheathing is inevitable, along with a concomitant reduction in the effectiveness of the insulation installed between framing members. The damage to the underlying structure will eventually result in a loosening of the siding boards, trim components, appliques and other decorative features from the structure. In addition, if the siding boards and trim are made of wood or a water-absorbing wood product, rotting, swelling, and warping of the siding boards and trim components, will also occur. Cracks in associated masonry can also result. As a consequence of this inherent defect in the design of conventional lapboard siding systems, any structure built in a climate having both wind and rain (i.e., nearly every region of the U.S.) is, essentially, a throw-away structure, or at the very least, one which will require major structural renovation every fifty or so years. Though typically no underlying sheathing is employed in large-panel siding systems, water can wick between the panel and the weather barrier and, then, through overlapping seams in the barrier layer, to insulation installed between framing members, where it can begin to rot the framing members.

In regions of the country with little wind, clapboards are typically secured to the underlying structure by top nailing, which is also referred to as blind nailing. Nails used in blind nailing are driven through the clapboard near the upper edge thereof so that the nails on that clapboard will be covered by the lower edge of the next-installed clapboard directly above. Thus, each progressively higher clapboard overlaps the nails used to secure the immediately lower clapboard, thus rendering all nails, other than those on the topmost clapboard blind, or hidden from view. Blind nailing secures the clapboards to the underlying structure and provides an aesthetically pleasing appearance to the clapboard siding. However, with the only fastening mechanism being applied at the tops of the clapboards, the lower portion of each board is unsecured. In the presence of moderate or high winds, it is common for wind to lift the loser edges of the clapboards, causing the blind nails to loosen and bend, or even dislodge clapboards from the underlying structure. As a consequence of the potential for wind damage to clapboard siding, it is common to secure clapboards with blind (hidden) nails along the top edge of each board and face (exposed) nails along the lower portion of each board. The face nails are driven through the lower portion of one clapboard, through the upper edge of an overlapped, clapboard, through the weather barrier, and into the underlying sheathing layer. Though clapboards can be secured by blind nailing, conventional trim pieces associated with the clapboard siding must be face nailed to the underlying structure. It should be mentioned that with a board-and-batten siding system, though the boards may be blind nailed, the battens must be face nailed.

Though face nails provide additional strength to clapboard structure, they also introduce some additional new problems. One problem with face nailing is that it is considered by many to be unsightly. In order to mitigate the unsightly effect of face nailing, each face nail must be countersunk below the surface of the clapboard, the resulting depression caulked to a level even with the exterior surface of the clapboard, and the caulk compound painted along with the clapboard. In addition to being incredibly time-consuming, the caulking of each face nail creates long-term problems, primarily because the caulk seal deteriorates over time and the color of the paint over caulk changes at a rate different that of the paint over the clapboard material. The seal deteriorates over time because of differences in coefficients of expansion between the caulk and the clapboard material, a loss of resilience by the caulking compound over time due to damage sustained by exposure to ultraviolet light, heat, and an oxidizing environment. Once the caulk seal is breached, exposed wood grain in the countersunk depression can absorb water, causing the clapboard to swell around the face nail. In addition, the breach in the seal creates a leakage path around the nail head and through the nail hole into the sheathing. Expansion and contraction of the clapboards with changes in temperature and humidity can enlarge the nail holes in the clapboards, making them more than trivial sources of leakage. The problem of water seepage also afflicts older aircraft having wings made of wood that are covered with a waterproof layer of painted polyester fabric that functions much as siding on a building. Sheet metal flap seals are typically secured to the trailing edge of the wings with wood screws. It is extremely difficult (almost impossible) to prevent the entrance of moisture around the heads of the screws and into the wing structure. The entrance of moisture will invariably cause structurally-debilitating rot of the wing's trailing edge. The identical process of destruction occurs, over time, on a building with face nailed siding.

Another problem associated with clapboard siding systems is that the bottommost clapboard or starter strip contacts the foundation or wainscot. During rain or yard watering, water collects at the juncture of the juncture and wicks behind the boards, thereby increasing the likelihood that, over time, significant water damage will occur.

With some lap siding systems, clearance of at least two inches, between the roof and the lap siding system, may be required. Flashing and counter flashing may be installed and caulked to protect the gap from wind and water. However, this gap may be unsightly and, like the junctions discussed above, the caulk and flashing may fail so that water is able to seep behind the flashing and behind the siding.

Conventional lapboard siding systems rely heavily on caulking to secure the structure against water leakage and the problems associated therewith. Typically, joints between clapboards are caulked, as are junctures where planks terminate at other structural or decorative features, such as windows, doors, trim, or changes in the contour of the underlying structure. However, time has shown that a perfect and complete seal of a structure against the elements is impossible to achieve and, in fact, may exacerbate the problems associated with water leakage over time. The inventor believes that any attempt to seal a building against leakage of water into the frame structure will invariably fail while, at the same time, succeed in permanently trapping any water that breaches the "seal" so that it can affect maximum damage. The inventor also believes that conventional, unbreathable lapboard siding systems, which leave no continuous vertical gap between the underlying framed structure and the siding and siding trim components, and which use extensive amounts of caulking compound in an failed attempt to seal out moisture from the structure, unnecessarily shorten the life expectancy of not only the structure but, very likely, that of each of those who dwell in the structure, by potentially exposing them to mold.

As heretofore described, moisture can penetrate the exterior shell of a "sealed" structure in a number of ways, including through the face nail holes in the siding, through joints between lapboards, through trim transitions, and through seams and nail holes in the weather barrier. Once moisture is trapped behind the weather barrier, the opportunity for it to evaporate is severely limited, as airflow in a well-built frame structure is virtually non-existent. If moisture is leaking behind the weather barrier faster than it can evaporate, eventual destruction of the building is assured.

Accordingly, a need exists for a lap siding and trim system that avoids unsightly junctures of elements, that, with very few exception, scrupulously avoids face nailing, and which does not require the application of caulking. Furthermore, a need also exists for a lapboard siding and trim system that can be installed flush with the roof.

The soffit and fascia trim systems of conventional lapboard siding systems have historically been the most time-consuming and complicated aspects of the siding installation process, particularly when these regions of the building are desirably waterproofed and aesthetically pleasing. In the soffit and fascia region of the building, siding elements meet at a variety of angles and typically in small work areas that complicate the installers' efforts.

SUMMARY OF THE INVENTION

The present invention provides a lapboard siding and trim system that is designed to breathe, so that moisture can drain away from the weather barrier before it wicks into the interior structure. All of the siding and trim pieces are spaced away from the weather barrier that covers the sheathing and frame structure of the building, thereby leaving a gap that is continuous from the top of the structure to the foundation. Any water that penetrates the siding and trim components and ends up within this gap drains to vents at the very bottom of the siding and trim system, where it is expelled to the exterior. Any residual moisture in the gap-evaporates through the action of air currents generated by winds and breezes. By allowing the siding and trim system to breathe, the sheathing and underlying frame structure of the building is much better protected against the incursion of water and moisture than they would be if a "sealed" siding and trim system were employed. One tremendous advantage of the present system is that very little, if any, caulking need be used as a sealant. This dramatically lowers installation costs and also eliminates the need to recaulk a structure after oxidation, heat and light have caused caulking to fail from deterioration and shrinkage. It is estimate that the present siding and trim system is up to 99 percent free of face nailing. At the very most, installers may opt to use some caulk with the present system, but the amount used would be reduced by more that 95 percent.

Trim pieces of the present siding and trim system are manufactured through a co-extrusion process, whereby wood/thermoplastic resin composite material and polyvinyl chloride thermoplastic resins are co-extruded through a single die assembly, thereby producing a trim piece having a plastic composite component, that will be visible following installation, fused under heat and pressure to the polyvinyl chloride standoff and attachment fins, that will be hidden following installation. Prototype lapboards and trim components have been produced using nearly any available cellulose fiber—which may include sawdust, rice hulls, and bamboo shoots—in combination with thermoplastic resins. High-density polyethylene (HDPE) resin, which has been used to manufacture the prototype lapboards and trim components, is readily available and has been used successfully for wood composite materials (e.g. Trek® deck lumber) in the past. Other thermoplastic resins and thermoplastic polymer resin alloys may also be used in place of the HDPE. The result is a fully-assembled lapboard siding trim piece with standoff and attachment fins formed as a completely waterproof, single unit of maximum structural integrity. The individual siding and trim components are designed so that the polyvinyl chloride standoff and attachment fins are not subjected to direct sunlight, thereby ensuring longevity of the co-extruded structure. In addition, the cellulose and resin composite is designed to be painted, thereby largely protecting that material from the ultraviolet component of sunlight. The structural integrity of these siding and trim components is such that they can withstand winds up to 200 miles per hour. When the cost of the extrusion dies are amortized over a production run, the cost of trim pieces so formed is substantially less than the cost of similar trim pieces manufactured in a process whereby the trim piece and standoff and attachment fins are extruded in separate processes and subsequently joined together using adhesives or mechanical fastening techniques. In addition, installation costs are substantially reduced, not only because the trim components are light weight and fully assembled upon arrival at the job site, but they require thirty percent less nailing than standard trim components.

The lapboard siding and trim system of the present invention is designed to be up to 99 percent free of face-nailed components. Only the topmost lapboard requires face nailing, and only one edge of exterior door requires face nailing. This almost complete absence of face nailing not only provides a much cleaner appearance, but also eliminates the need to caulk and paint face-nailed siding and trim components. The enhanced appearance brought about by the almost complete elimination of face nailing of siding and trim components endures for the life of the siding and trim, which is expected to be at least fifty years and, likely, double that period. Given that installation mistakes are far less likely to occur using fully-assembled trim components, fifty year warranties can be provided to original owners and their successors in interest with minimal risk.

A further advantage of the present siding and trim system is that the standoff and attachment fins on trim pieces is flexible, thereby enabling most trim pieces to move within a limited range as the siding components expand and contract as a result of variations in temperature and/or humidity. The expansion and contraction of siding and trim components incurs neither structural nor cosmetic damage over time.

The present invention provides a complete lapboard siding and trim system, and includes components to cover the entire structure, from the fascia down to the foundation. The following trim components are provided in connection with the present invention: outside corner trim, inside corner trim, apron trim, batten apron trim, frieze board trim used for clapboard siding, frieze board trim used for board-and-batten siding, door trim, window trim, fascia trim, round batten trim, square batten trim, and gable frieze board trim. In addition, a standoff bushing is provided for use in connection with the co-extruded window trim, and an apron support clip is used in connection with the co-extruded apron trims. For a presently preferred embodiment of the invention, the bushing and clip are manufactured from ABS thermoplastic resin.

The siding and trim system of the present invention represents a revolutionary advance in the art, in that it solves problems inherent to lapboard siding and trim that have remained largely unaddressed for over 100 years. This new siding and trim system eliminates virtually all face nailing, which is still standard practice for lapboard siding and associated trim. Pin nailing, which is required only on one edge of door trim and on topmost trim or lapboards, is barely detectable. In addition, the new siding and trim system completely eliminates the need for caulking. Filling of pin-nailed components is optional. The new siding and trim system is designed so that any mistakes in installation will result in merely cosmetic, rather than structural defects.

It is well known that siding and trim components that are nailed directly to the building structure have limited ability to absorb expansion and contraction, which are caused primarily by temperature changes. In fact, if siding and trim that is so attached expands or contracts at a rate much different than the underlying building structure, those components may fail. In the best scenario, nail holes through the siding and trim pieces will elongate over time and those components will become loosened from the underlying structure. The trim pieces of the siding and trim system are designed to absorb expansion and contraction. The polyvinyl chloride fins on the trim pieces have both flex and memory so that those pieces can move when the siding boards expand and, then, return to their original position and shape when the siding boards contract. As the polyvinyl chloride fins on each of the trim pieces is completely protected from sunlight, the flex and memory qualities of that material will degrade very little, if at all, during the lifetime of the product.

The lapboard siding and trim of the present invention also prevents water entrapment between the weather barrier and the siding and trim by creating an air gap between the weather barrier and the siding and trim. The PVC fins on the trim components are designed to displace the trim pieces from the weather barrier, and ABS plastic standoffs are used to displace the lapboards from the weather barrier, thereby creating an air gap between the weather barrier and the siding lapboards and trim. The bottom of each air gap is provided with drain channels that duct water to the exterior. These drain channels also promote air circulation within the air gap so that any moisture will evaporate instead of being wicked through the weather barrier and into the underlying sheathing and frame structure of the building. Though the structure, as a whole, is no more water proof than conventional structures, the difference is that any water between the siding lapboards and trim has no opportunity to wick into the sheathing and frame structure.

An unbiased, third-party organization was hired to perform a time and motion study with respect to installation of the siding and trim system of the present invention. For the study, a typical residential frame structure covered with waferboard sheathing and wrapped with a weather barrier layer was twice covered with siding and trim components by an experienced siding installation crew. It was first covered with conventional siding and trim components, which were nailed directly to the sheathing over the weather barrier. Trim components were cut from flat siding stock at the work site. The structure was then stripped and recovered with siding and trim components of the present invention. The study concluded that the siding and trim components of the present entire system install approximately 46 percent faster than conventional siding and trim components. In spite of the somewhat higher cost of the co-extruded trim components, it is very clear that not only is the finished building cost about 10 percent less when the siding and trim components of the present invention are used, but the final structure is aesthetically and structurally superior, in addition to having far greater longevity.

The trim components have been designed so that they can be used with other siding products, such as the Hardie Plank® manufactured by James Hardie Industries NV (a limited liability company registered in the Netherlands) and the Smartside® clapboards manufactured by Louisiana Pacific Corporation. Use of the trim is not limited the planks and clapboards from these two largest siding manufacturers. The siding attachment clips of the present invention can be manufactured with small dimension changes to accommodate lapboard siding from any manufacturers. In fact, the trim components can even be used with siding shingles or with large-panel plywood and waferboard siding. In such a case, the 11 mm-thick panels are considerably thinner than overlapped clapboards. Consequently, a filler batten is installed within the trim recesses to provide a finished appearance.

BRIEF DESCRIPTION OF THE DRAWINGS

FIG. 16 is a cross-sectional view of the co-extruded apron of FIG. 15;

FIG. 20 is a cross-sectional view of the co-extruded mid-wall apron of FIG. 19;

FIG. 22 is a cross-sectional view of the co-extruded mid-wall apron of FIG. 21;

FIG. 26 is a cross-sectional view of the co-extruded frieze board of FIG. 25;

FIG. 33 is an isometric view of an extruded clapboard;

FIG. 34 is a cross-sectional view of the extruded clapboard;

FIG. 41 is an isometric view of a filler piece used for the overhead door trim installation in FIG. 51;

FIG. 42 is a cross-sectional view of the filler piece;

FIG. 43 is an isometric view of a custom corner trim piece;

DETAILED DESCRIPTION OF THE INVENTION

Figure 1:
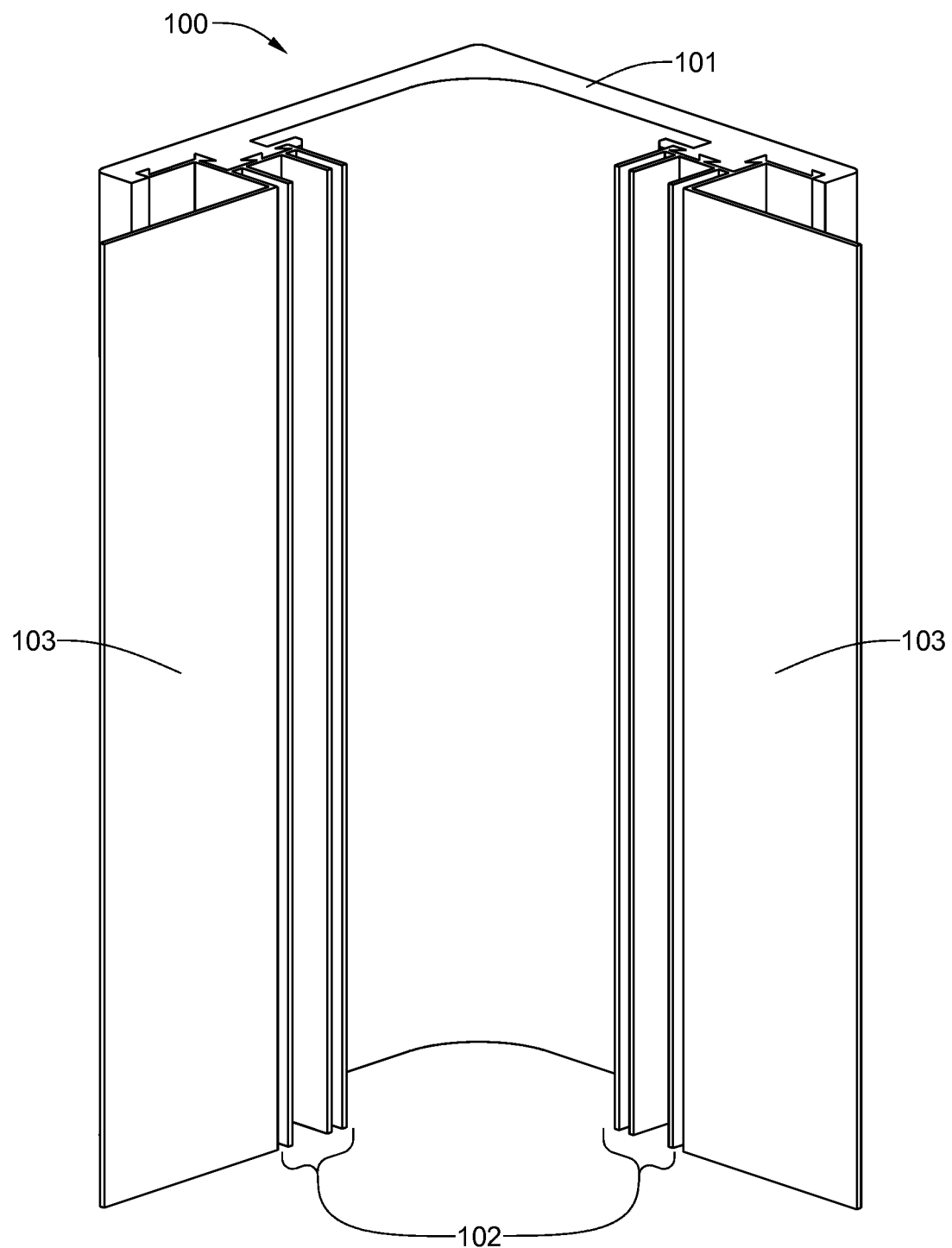
FIG. 1 is an isometric view of a co-extruded outside corner.

The present invention provides a lapboard siding and trim system in which trim siding components for board-and-batten siding and associated trim components are manufactured using a co-extrusion process, whereby wood/thermoplastic resin composite material and polyvinyl chloride thermoplastic resins are co-extruded through a single die assembly, thereby producing a trim piece having a plastic composite component, that will be visible following installation, fused under heat and pressure to the polyvinyl chloride standoff and attachment fins, that will be hidden following installation. The result is a fully-assembled lapboard siding trim piece with standoff and attachment fins formed as a completely waterproof, single unit of maximum structural integrity. The structural integrity of these siding and trim components is such that they can withstand winds up to 200 miles per hour. When the cost of the extrusion dies are amortized over a production run, the cost of trim pieces so formed is substantially less than the cost of similar trim pieces manufactured in a process whereby the trim piece and standoff and attachment fins are extruded in separate processes and subsequently joined together using adhesives or mechanical fastening techniques. In addition, installation costs are substantially reduced, not only because the trim components are light weight and fully assembly upon arrival at the job site, but they require thirty percent less nailing than standard trim components. The present invention also provides a lapboard siding and trim system in which siding components for clapboard siding are manufactured by extruding wood/thermoplastic resin composite material through a die. Associated trim components are manufactured using the coextrusion process described above. Some of the trim components for both siding systems are identical, while others are manufactured with gap spacings specifically tailored to the particular system.

The lapboard siding and trim system of the present invention is designed to be almost completely devoid of face-nailed components. Only the topmost lapboard requires face nailing, and only one edge of exterior door requires face nailing. This almost complete absence of face nailing not only provides a much cleaner appearance, but also eliminates the need to caulk and paint face-nailed siding and trim components. The enhanced appearance brought about by the almost complete elimination of face nailing of siding and trim components endures for the life of the siding and trim, which is expected to be at least fifty years and, likely, double that period. Given that installation mistakes are far less likely to occur using fully-assembled trim components, fifty year warranties can be provided to original owners and their successors in interest with minimal risk.

A further advantage of the present siding and trim system is that the standoff and attachment fins on trim pieces is flexible, thereby enabling most trim pieces to move within a limited range as the siding components expand and contract as a result of variations in temperature and/or humidity. The expansion and contraction of siding and trim components incurs neither structural nor cosmetic damage over time.

The present invention provides a complete lapboard siding and trim system, and includes components to cover the entire structure, from the fascia down to the foundation. The following trim components are provided in connection with the present invention: outside corner trim, inside corner trim, apron trim, batten apron trim, frieze board trim used for clapboard siding, frieze board trim used for board-and-batten siding, door trim, window trim, fascia trim, round batten trim, square batten trim, and gable frieze board trim. In addition, a standoff bushing is provided for use in connection with the co-extruded window trim, and an apron support clip is used in connection with the co-extruded apron trims. For a presently preferred embodiment of the invention, the bushing and clip are manufactured from ABS thermoplastic resin.

The siding and trim system of the present invention represents a revolutionary advance in the art, in that it solves problems inherent to lapboard siding and trim that have remained largely unaddressed for over 100 years. This new siding and trim system eliminates virtually all face nailing, which is still standard practice for lapboard siding and associated trim. Pin nailing, which is required only on one edge of door trim and on topmost trim or lapboards, is barely detectable. In addition, the new siding and trim system completely eliminates the need for caulking. Filling of pin-nailed components is optional. The new siding and trim system is designed so that any mistakes in installation will result in merely cosmetic, rather than structural defects.

The present invention provides a lapboard siding and trim system that is designed to breathe, so that moisture can drain away from the weather barrier before it wicks into the interior structure. All of the siding and trim pieces are spaced away from the weather barrier that covers the sheathing and frame structure of the building, thereby leaving a gap that is continuous from the top of the structure to the foundation. Any water that penetrates the siding and trim components and ends up within this gap drains to vents at the very bottom of the siding and trim system, where it is expelled to the exterior. Any residual moisture in the gap evaporates through the action of air currents generated by winds and breezes. By allowing the siding and trim system to breathe, the sheathing and underlying frame structure of the building is much better protected against the incursion of water and moisture than they would be if a "sealed" siding and trim system were employed. One huge advantage of the present system is caulking is not used as a sealant, but only to hide face nails in a very few locations. This dramatically lowers installation costs and also eliminates the need to recaulk a structure after oxidation, heat and light have caused caulking to fail from deterioration and shrinkage.

The lapboard siding and trim system, which is aimed specifically at the single-family, multi-family, residential and small commercial maerkets, will now be described in detail with reference to the attached drawing FIGS. 1 through 53. It should be understood that the drawings are meant to be merely illustrative of the system and may not be drawn to scale.

Figure 2:
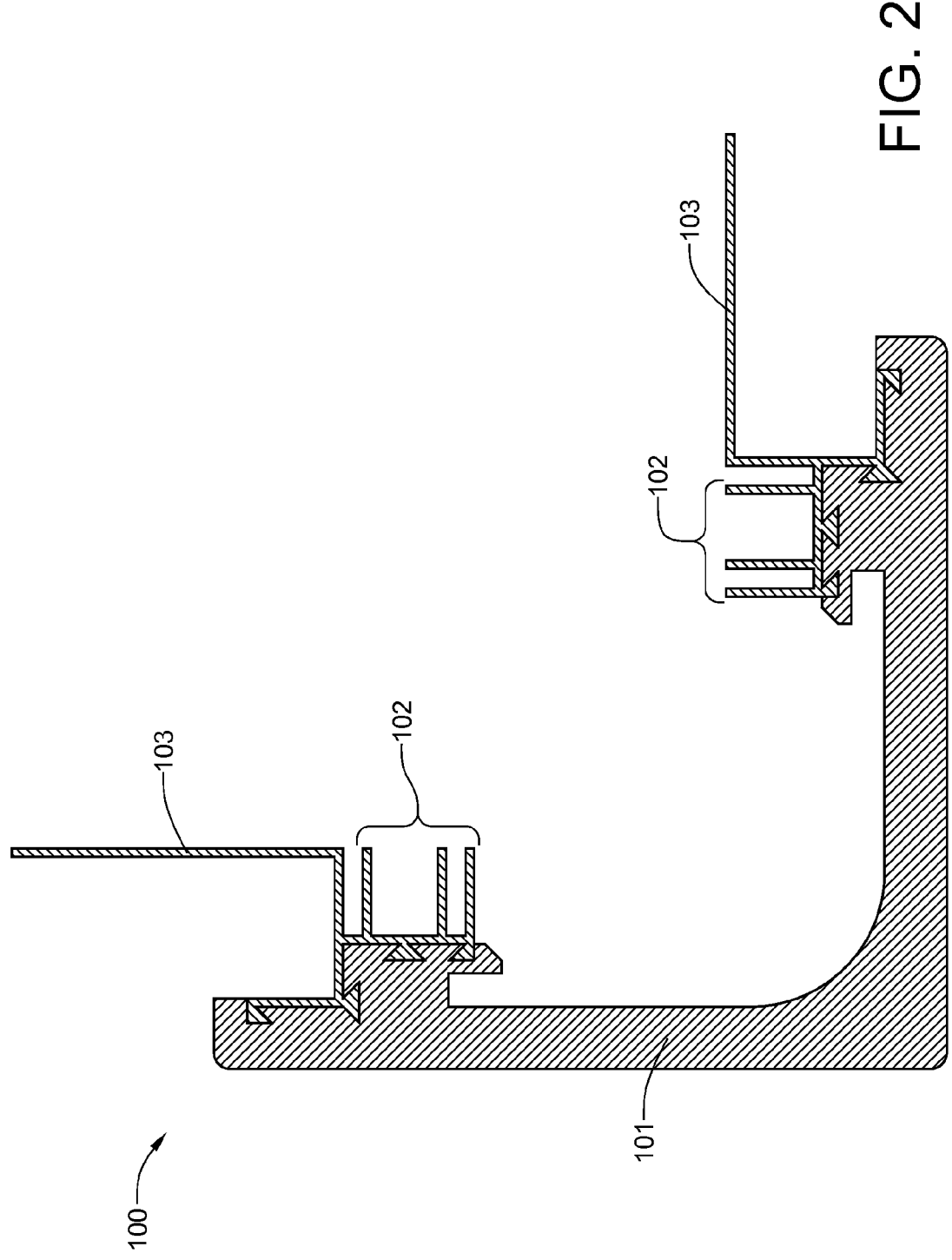
FIG. 2 is a cross-sectional view of the co-extruded outside corner.

Referring now to FIGS. 1 and 2, a co-extruded outside corner trim piece 100 includes a wood fiber/thermoplastic resin composite material (hereinafter, "composite material") outside corner trim body 101, polyvinyl chloride (hereinafter, "PVC") standoffs 102 and PVC attachment fins 103. The composite material and the PVC are two different materials that are molecularly joined via heat fusion during the co-extrusion process. The co-extruded outside corner trim piece 100, like all of the trim pieces disclosed herein are unitary in structure. The two different materials are required for proper functioning of the trim pieces. The composite material has several functions: prevent ultraviolet radiation from attacking the barrier layer in which the underlying structure is wrapped for water and wind resistance; provide an aesthetically pleasing shell around the underlying structure that absorbs mechanical blows that would otherwise damage that structure; and create a ventilated air gap between the shell and the underlying structure that is of paramount importance in keeping moisture from wicking into the interior structure. The PVC components of the trim piece 100 not only enables secure anchoring of the trim piece 100 to the underlying structure, but provides the standoffs which create the ventilated air gap. In addition, the PVC components are also flexible and have memory, which allows the siding components to expand and contract within an expected range, without damaging the trim piece 100. No part of the trim body 101 will be directly attached to the interior structure of the building. This is true for all trim components, except for the door trim, which will be hereinafter described.

Figure 3:
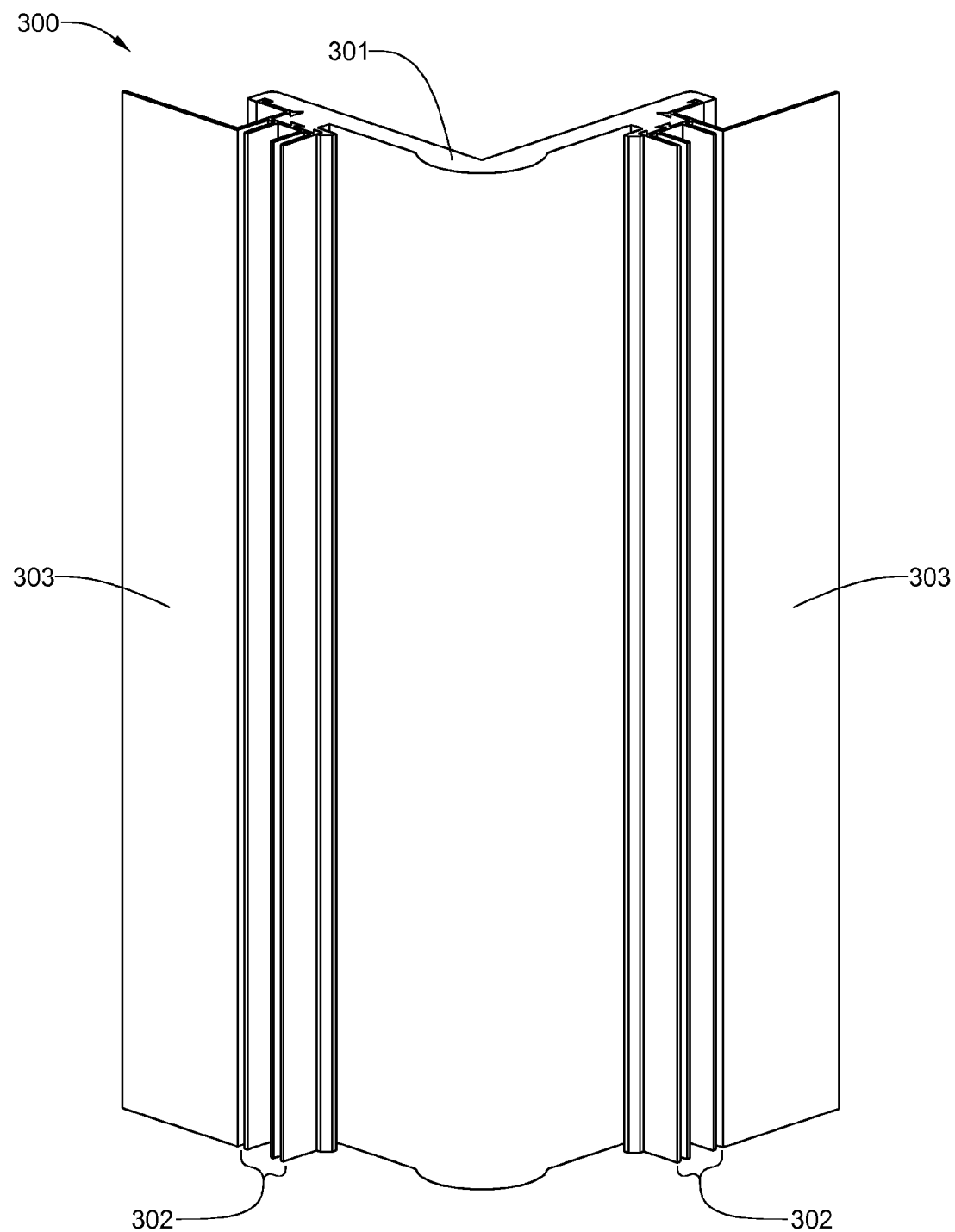
FIG. 3 is an isometric view of a co-extruded inside corner.
Figure 4:
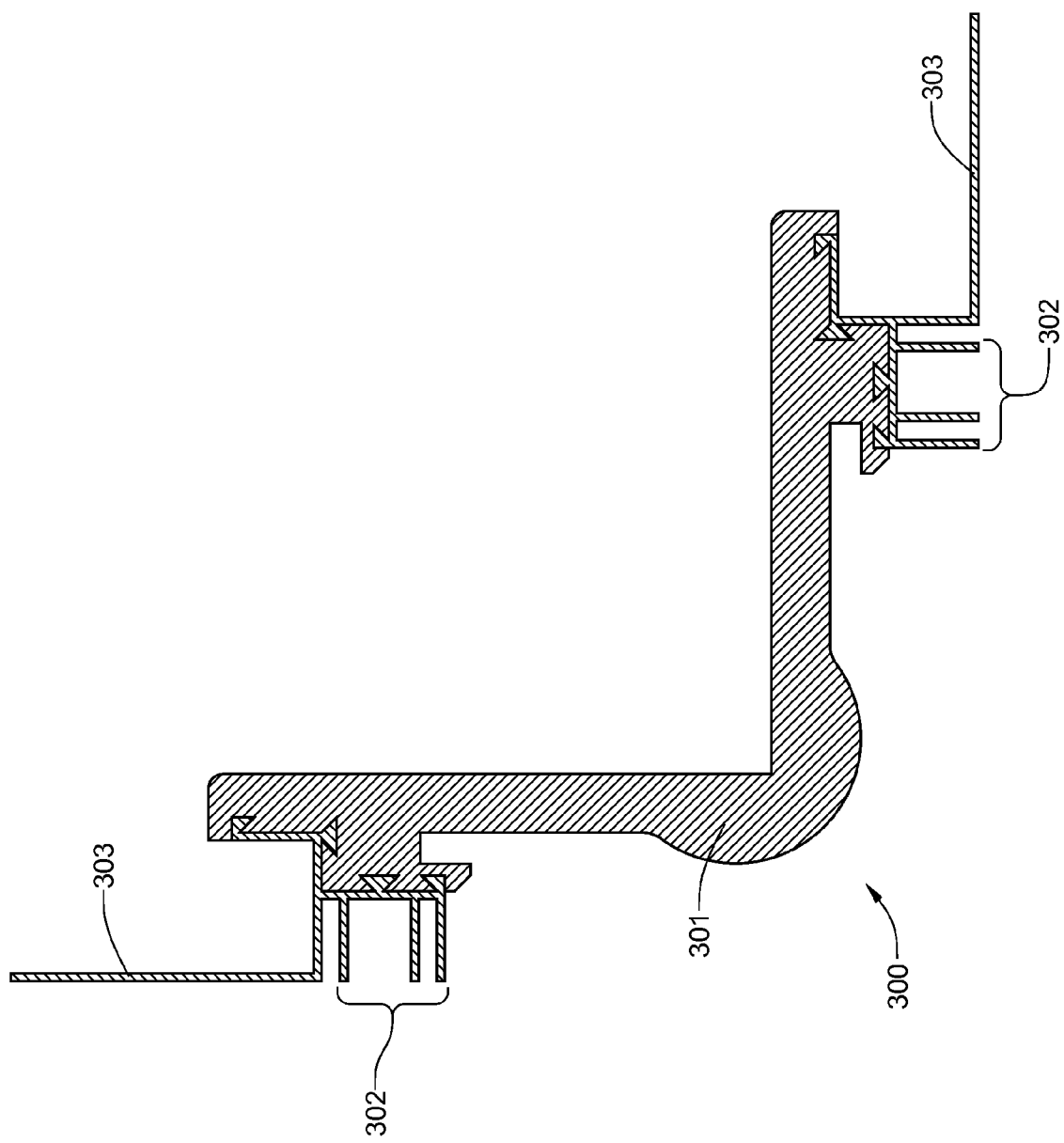
FIG. 4 is a cross-sectional view of the co-extruded inside corner.

Referring now to FIGS. 3 and 4, a co-extruded inside corner trim piece 300 includes a composite material inside corner trim body 301, PVC standoffs 302 and PVC attachment fins 303. The inside corner trim piece 300 is attached to the internal structure in the same manner that the outside corner piece 100 is attached thereto. The composite and PVC portions also function in a like manner.

Figure 5:
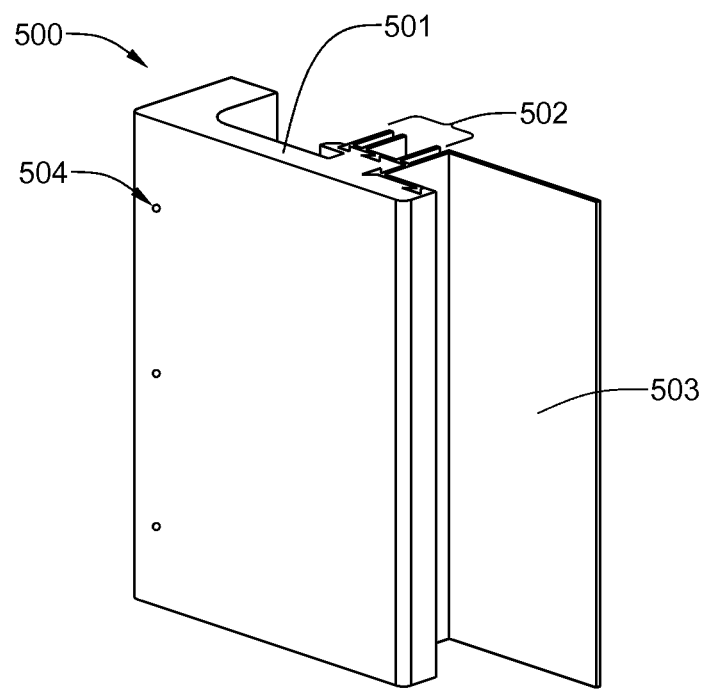
FIG. 5 is an isometric view of a co-extruded door trim.
Figure 6:
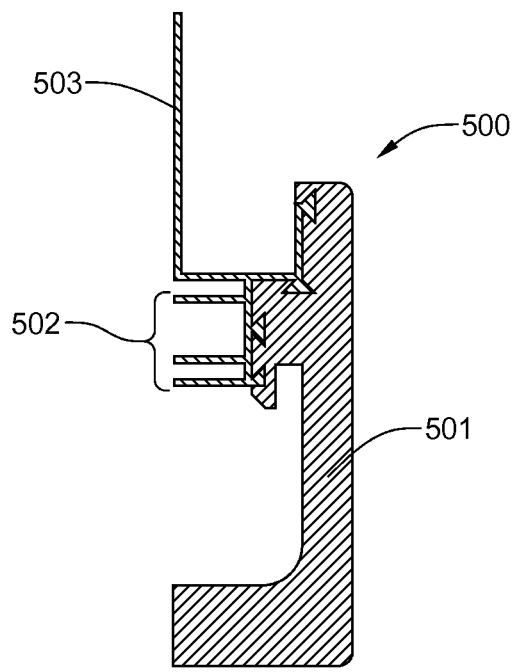
FIG. 6 is a cross-sectional view of the co-extruded door trim.

Referring now to FIGS. 5 and 6, a co-extruded door trim piece 500 includes a composite material door trim body 501, PVC standoffs 502 and a PVC attachment fin 503. The door trim piece 500 is one of the few pieces which employs face nailing for attachment to the door framing, but only on the inner edge 504 thereof.

Figure 8:
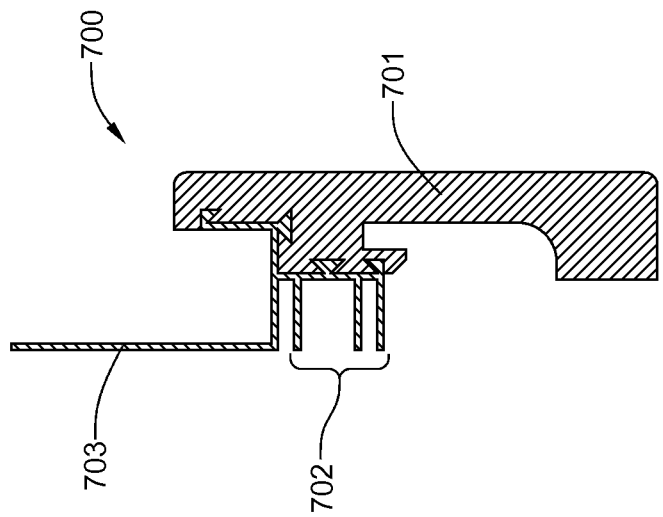
FIG. 8 is a cross-sectional view of the co-extruded window trim.
Figure 7:
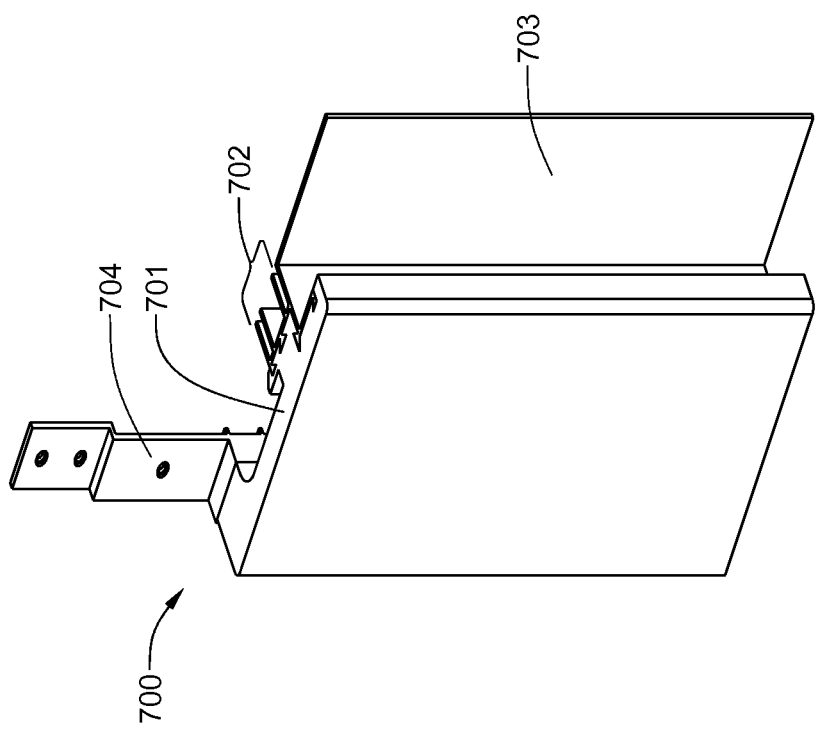
FIG. 7 is an isometric view of a co-extruded window trim and stand-off bracket.

Referring now to FIGS. 7 and 8, a co-extruded window trim piece 700 includes a composite material window trim body 701, PVC standoffs 702 and a PVC attachment fin 703. The attachment fin 703 is nailed or stapled along its length to the underlying structure of the building. The inner edge of the trim (i.e., the edge adjacent the edge of the window, overlies the window fin and is attached with standoff brackets 704 at the top and bottom thereof. Thus, the inner edge of the window trim piece 700 is attached in a cantilevered manner.

Figure 9:
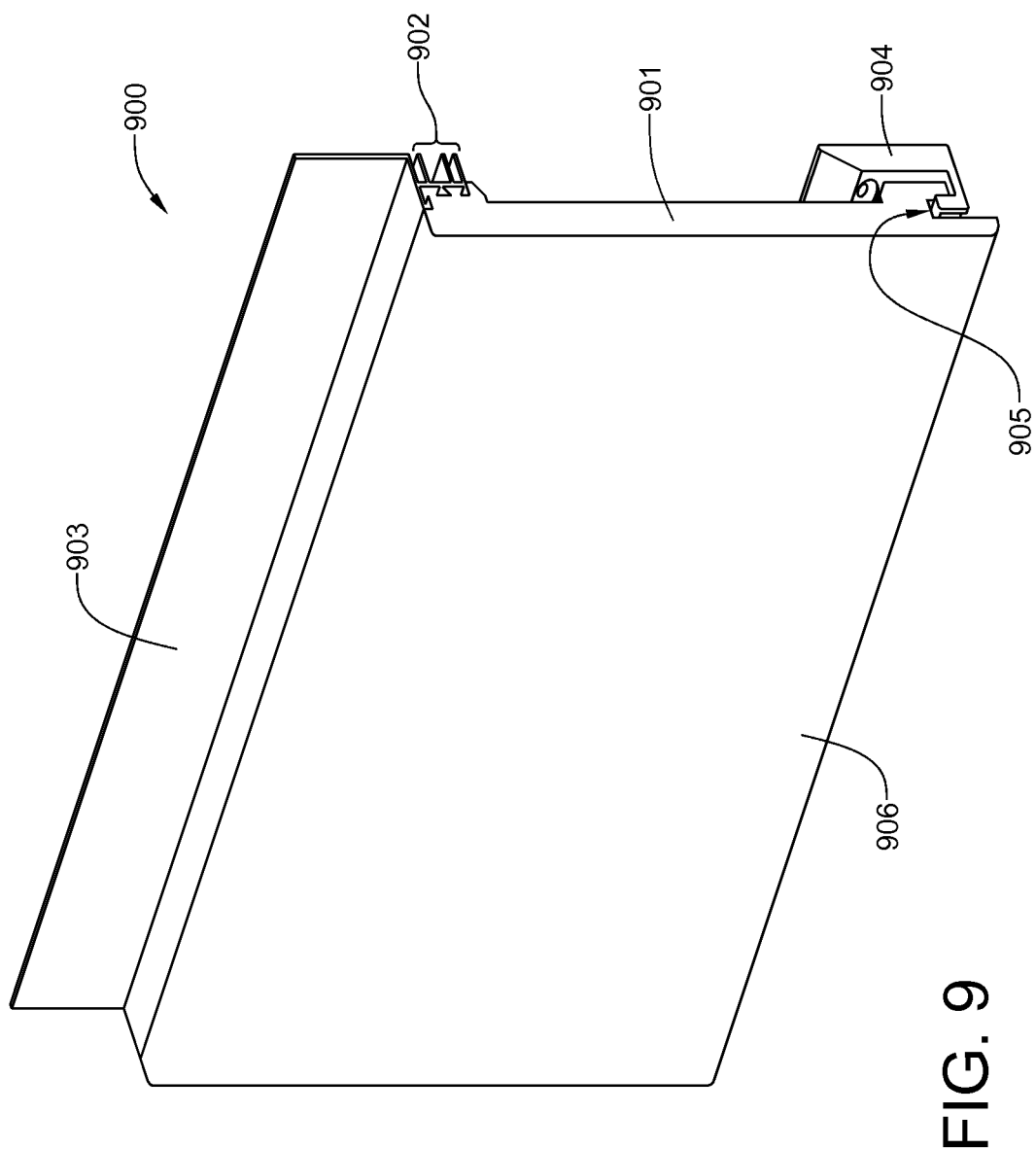
FIG. 9 is an isometric view of a co-extruded apron designed for use with clapboard siding.
Figure 10:
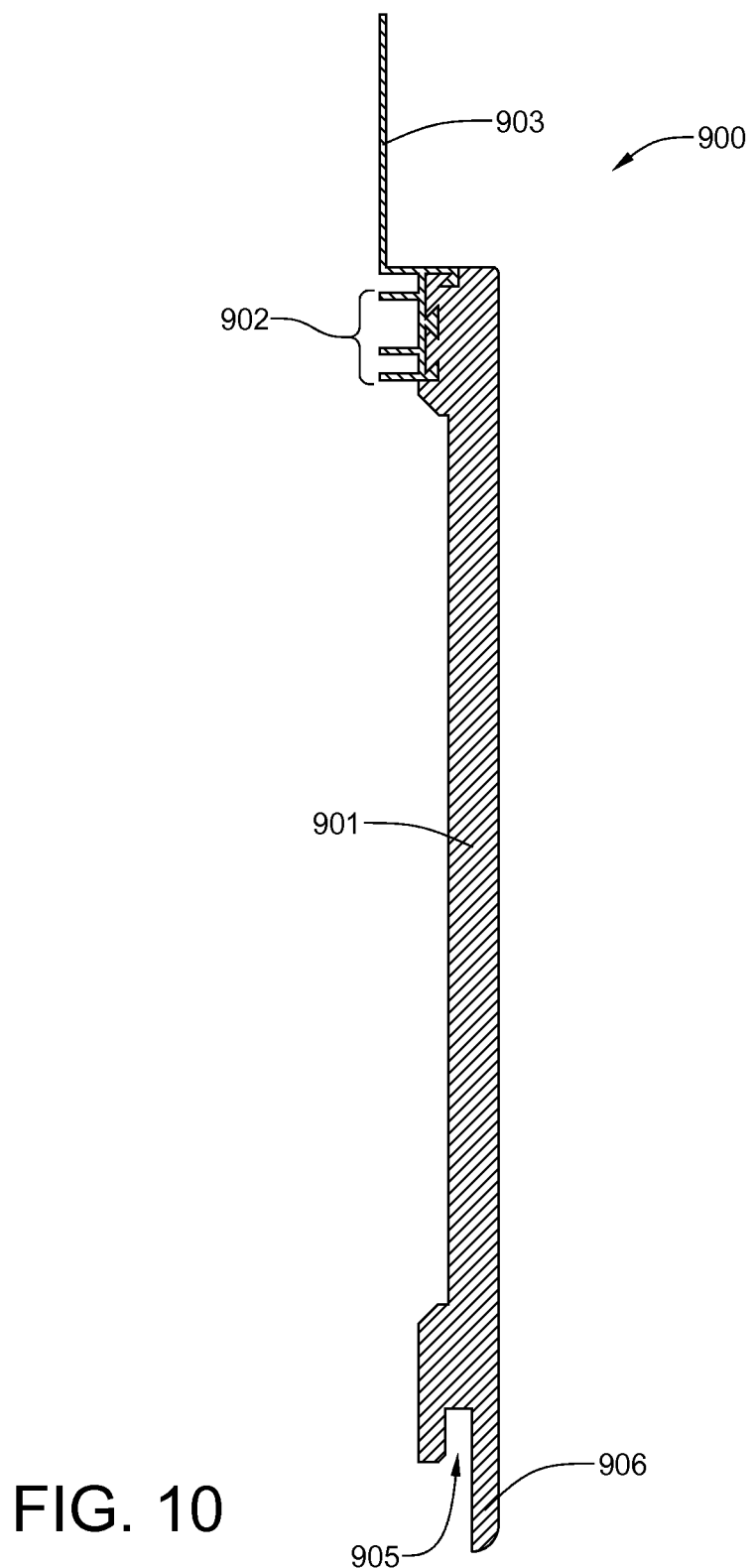
FIG. 10 is a cross-sectional view of the co-extruded apron of FIG. 9.

Referring now to FIGS. 9 and 10, the co-extruded apron trim piece 900 is intended for use with clapboard siding, and includes a composite material apron trim body 901, PVC standoffs 902 and a PVC upper attachment fin 903. This apron trim piece 900 is designed to be the first siding, or trim, component above the building's foundation. The lower edge of the apron trim piece 900 is secured (preferably screwed) to the underlying structure of the building with a hanger clip 904, which engages a hidden channel 905 on the lower back side of the apron trim piece 900. The first course of clapboard siding covers the upper attachment fin 903.

Figure 11:
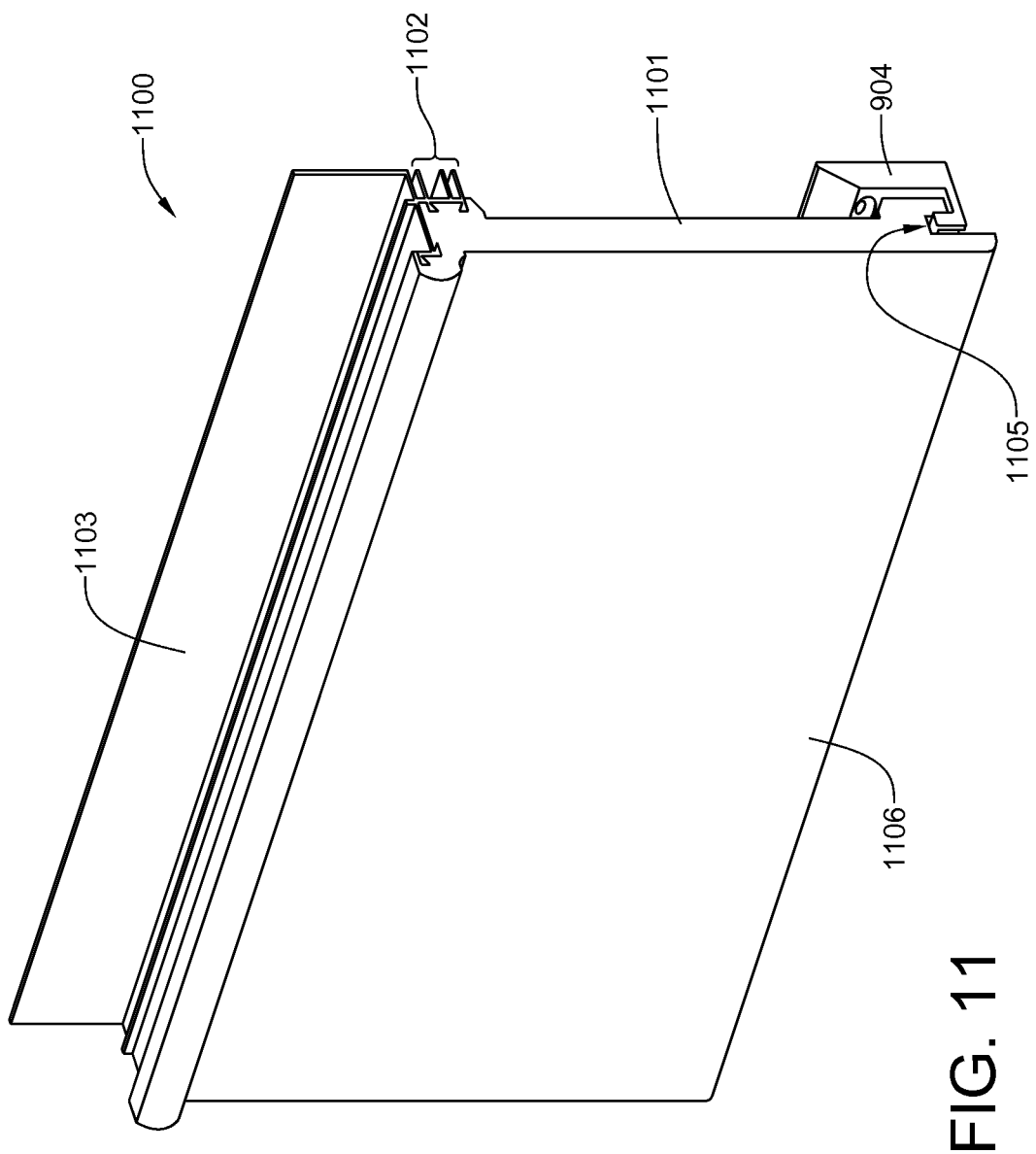
FIG. 11 is an isometric view of a co-extruded apron designed for use with board-and-batten siding.
Figure 12:
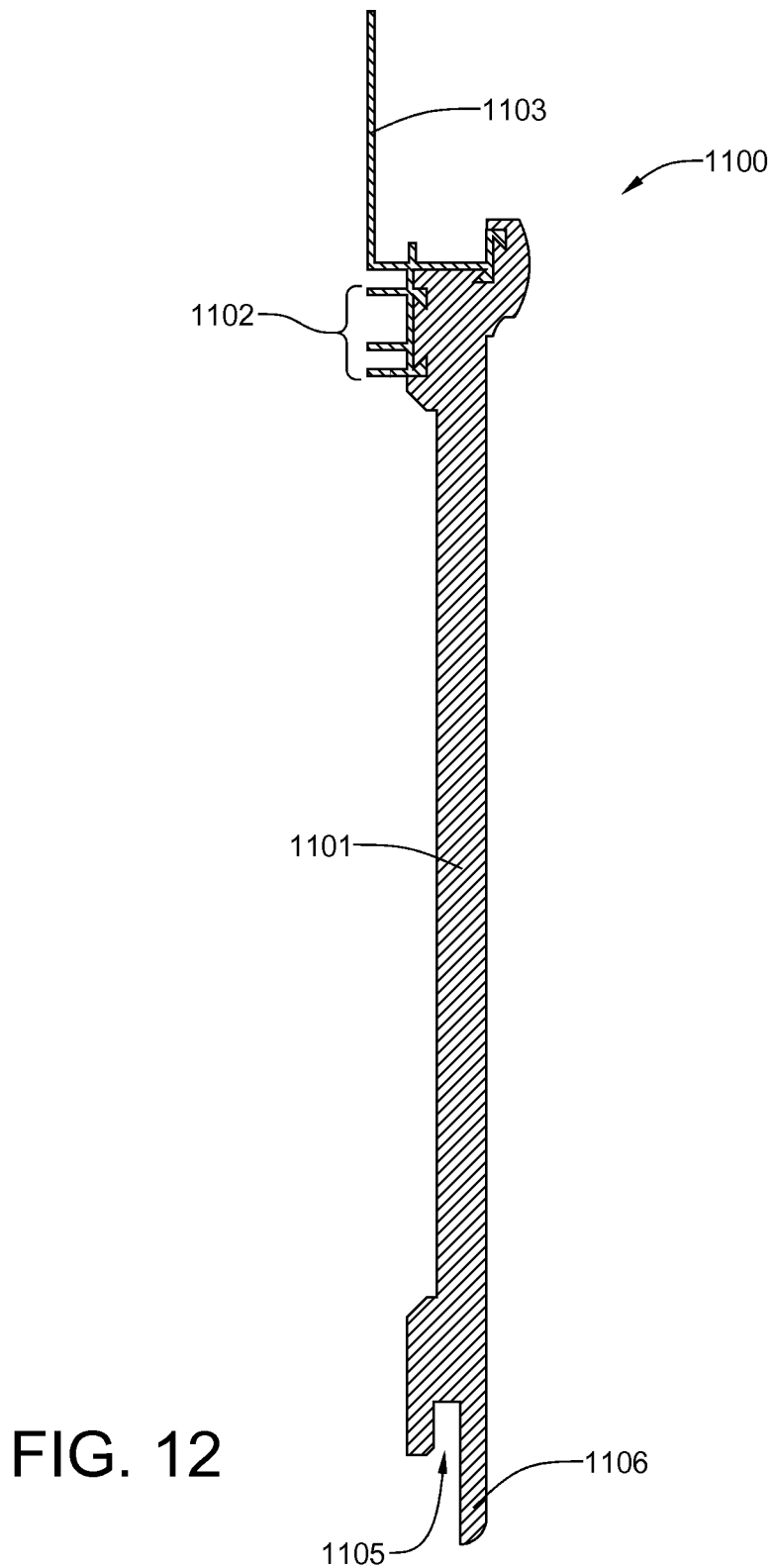
FIG. 12 is a cross-sectional view of the co-extruded apron of FIG. 11.

Referring now to FIGS. 11 and 12, the co-extruded apron trim piece 1100 is intended for use with board-and-batten siding, and includes a composite material apron trim body 1101, PVC standoffs 1102 and a PVC upper attachment fin 1103. The lower edge of the apron trim piece 1100 is secured (preferably screwed) to the underlying structure of the building with a hanger clip 904, which engages a hidden channel on the lower back side of the apron trim piece 1100. This apron trim piece 1100 is also designed to be the first siding, or trim, component above the building's foundation. The apron trim piece 1100 differs from that of FIGS. 9 and 10 in that it has an upward facing channel that hides the cut ends of the board-and-batten siding.

Figure 13:
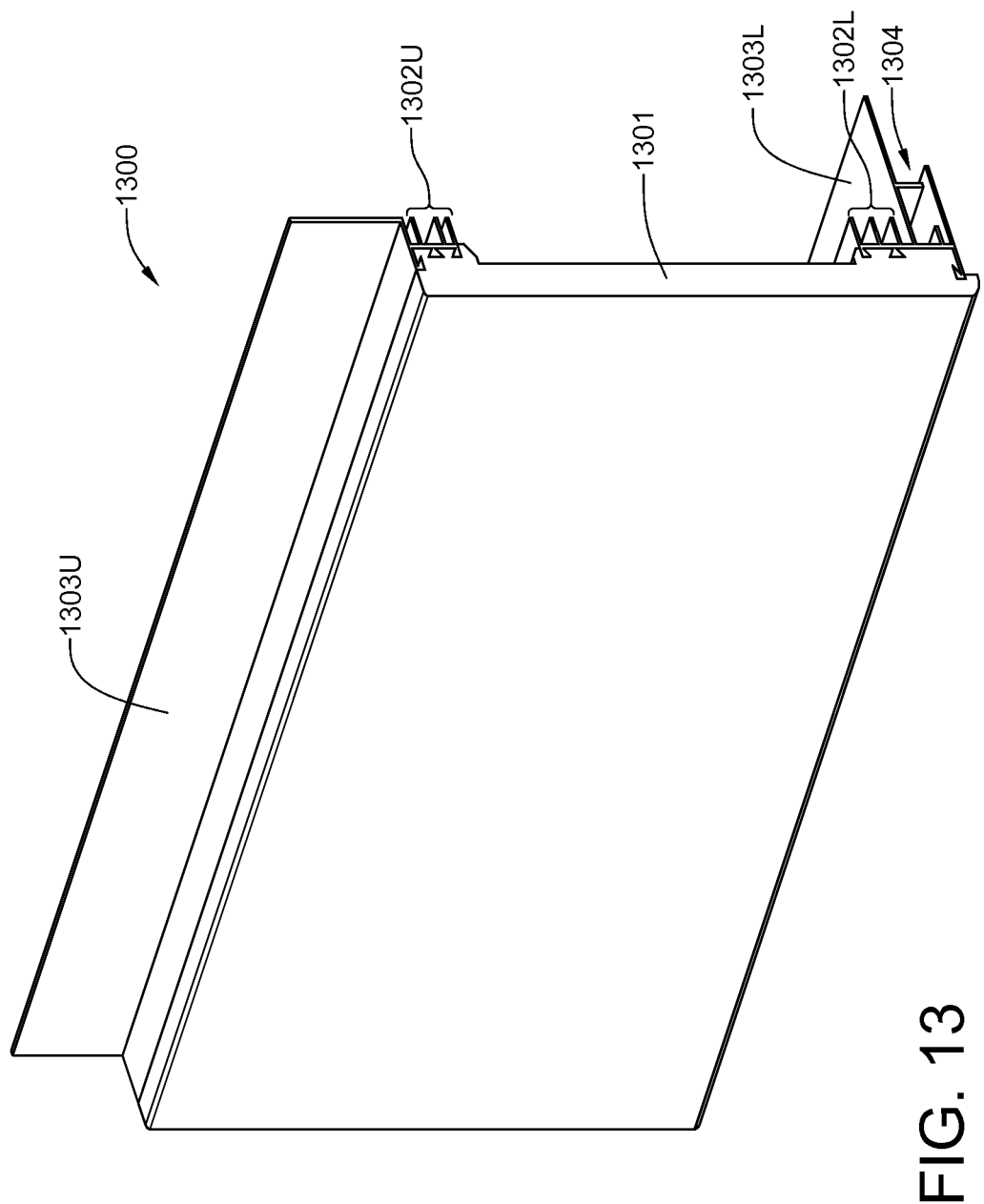
FIG. 13 is an isometric view of an apron for use with cantilevered floors and clapboard siding.
Figure 14:
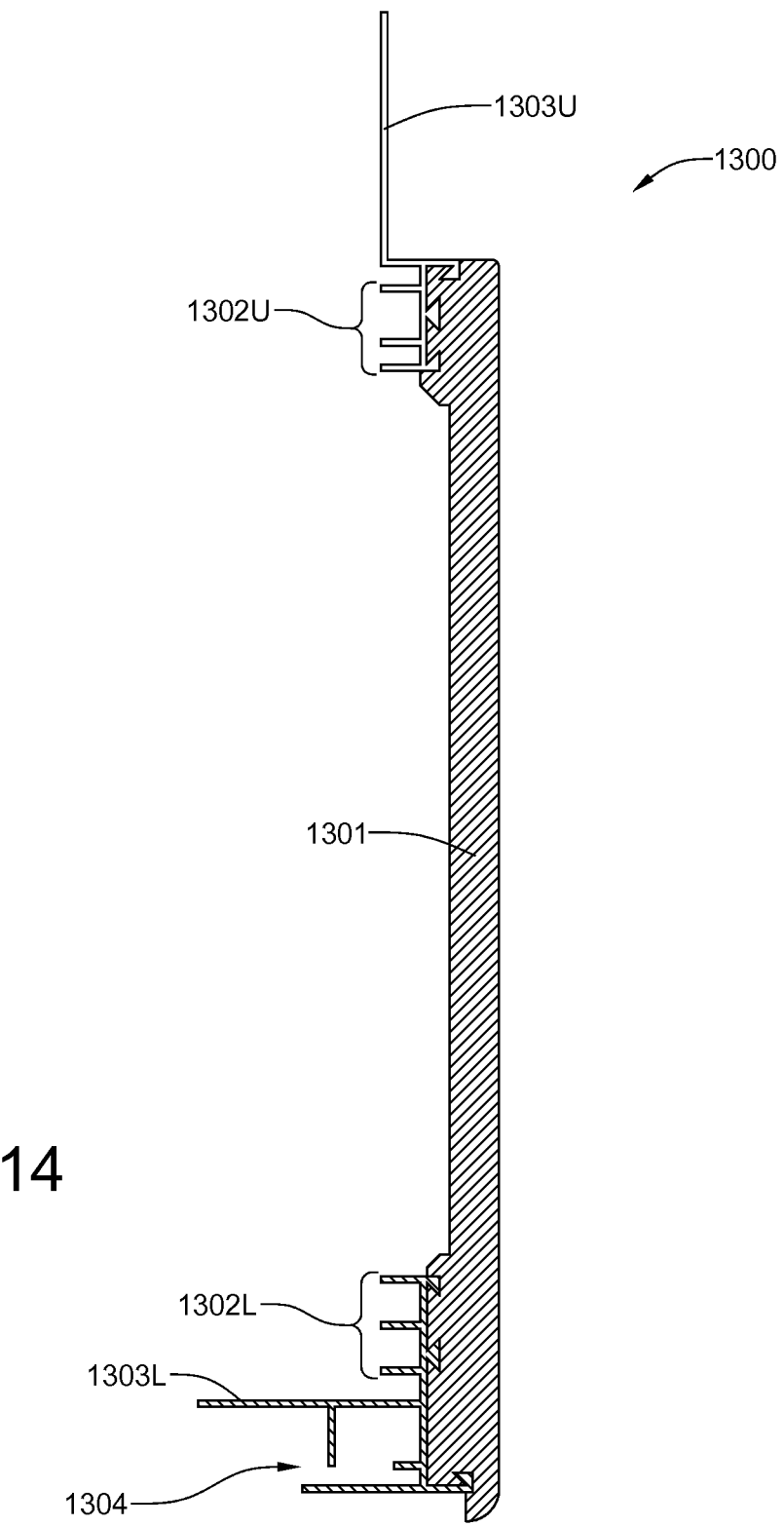
FIG. 14 is a cross-sectional view of the co-extruded apron of FIG. 13.

Referring now to FIGS. 13 and 14, the co-extruded apron trim piece 1300 is designed for the starter course at the bottom of a cantilevered floor, is intended for use with clapboard siding, and includes a composite material apron trim body 1301, upper and lower PVC standoffs 1302U and 1302L, respectively, and upper and lower PVC attachment fins 1303U and 1303L, respectively. The upper attachment fin 1303U is nailed or stapled to the wall, while the lower attachment fin 1303L is secured to the underside of the cantilevered floor. The first course of clapboard siding covers the upper attachment fin 1303U. A rear-facing groove 1304 at the bottom of this apron trim piece 1300 receives an edge of a soffit panel.

Figure 15:
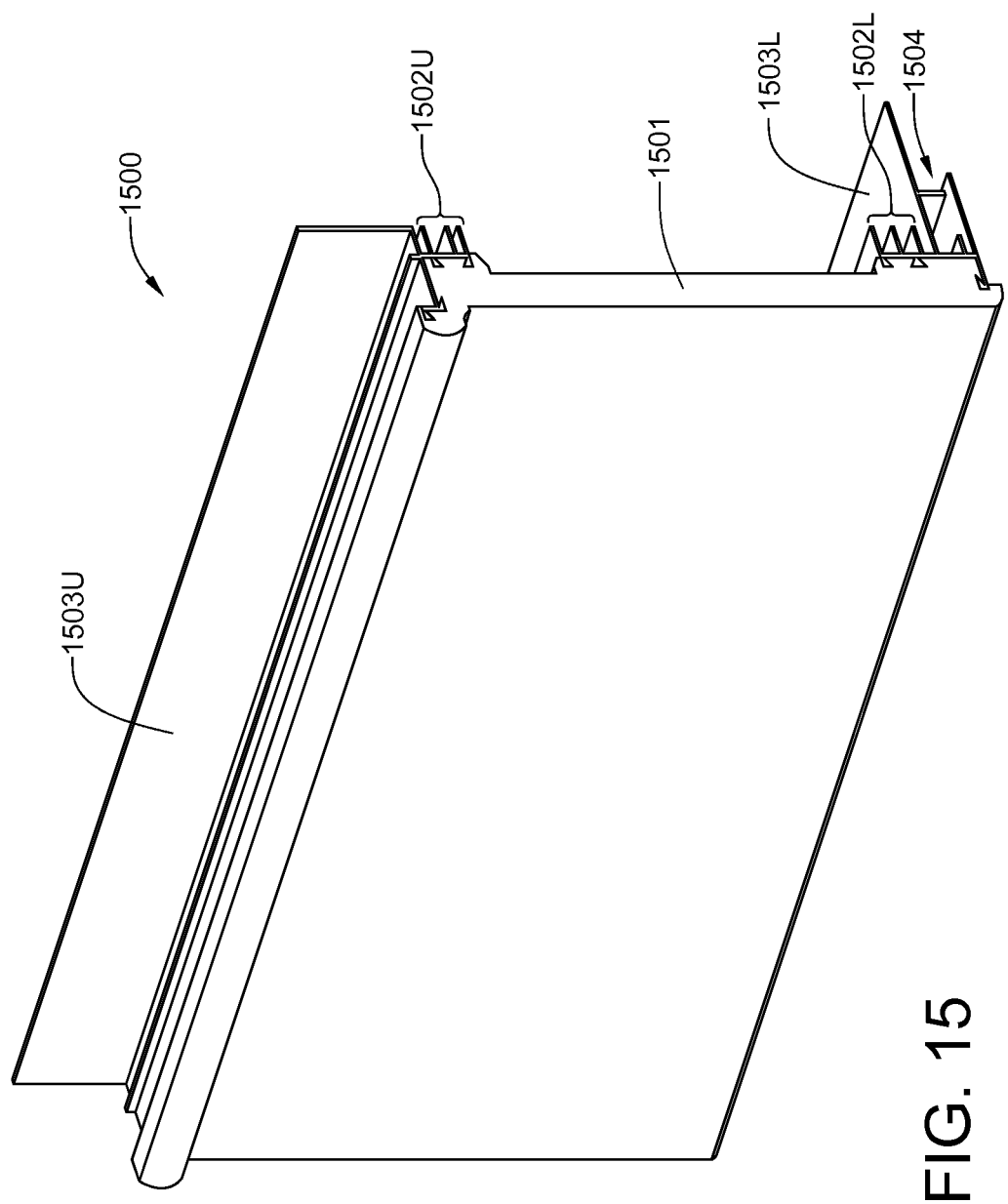
FIG. 15 is an isometric view of an apron for use with cantilevered floors and board-and-batten siding.

Referring now to FIGS. 15 and 16, the co-extruded apron trim piece 1500 is designed for installation on the bottom of a cantilevered floor, is intended for use with board-and-batten siding, and includes a composite material apron trim body 1501, upper and lower PVC standoffs 1502U and 1502L, respectively, and upper and lower PVC attachment fins 1503U and 1503L, respectively. The upper attachment fin 1503U is nailed or stapled to the wall, while the lower attachment fin 1503L is secured to the underside of the cantilevered floor. The cut lower ends of the board-and-batten siding fit within the groove 1504 at the top of the apron trim body 1501. A rear-facing groove 1504 at the bottom of this apron trim piece 1500 receives an edge of a soffit panel.

Figure 17:
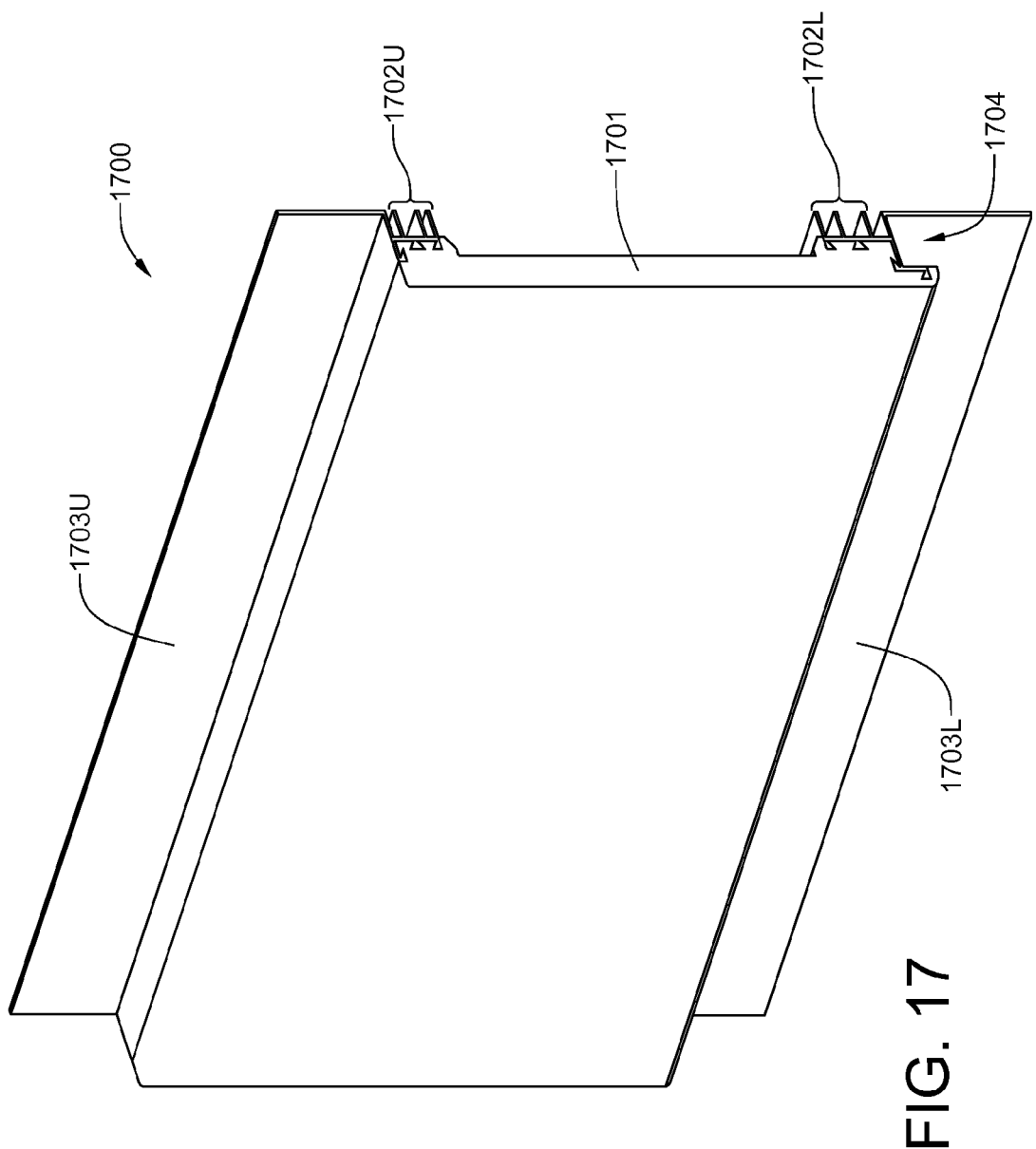
FIG. 17 is an isometric view of a co-extruded mid-wall apron used with clapboard siding both above it and below it.
Figure 18:
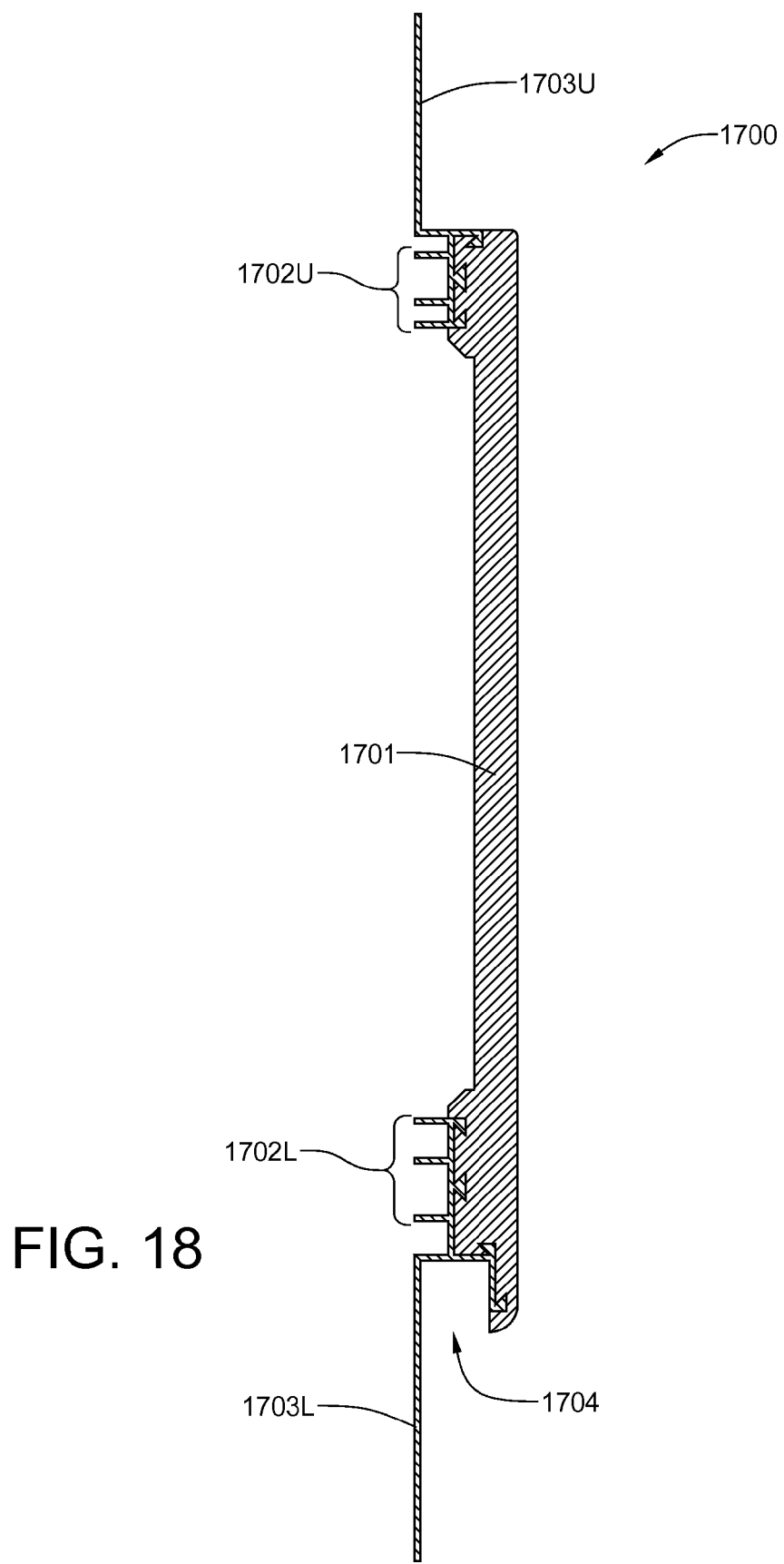
FIG. 18 is a cross-sectional view of the co-extruded mid-wall apron of FIG. 17.

Referring now to FIGS. 17 and 18, the co-extruded midwall apron 1700, which is designed to accommodate clapboard siding both above and below it, includes a composite material apron trim body 1701, upper and lower PVC standoffs 1702U and 1702L, respectively, and upper and lower PVC attachment fins 1703U and 1703L, respectively. Both attachment fins 1703U and 1703L are nailed or stapled to the wall. The first clapboard of the upper course covers the upper attachment fin 1703U, while the downward facing groove 1704 at the bottom of the apron trim body 1701 hides the upper edge of the last clapboard of the lower course.

Figure 19:
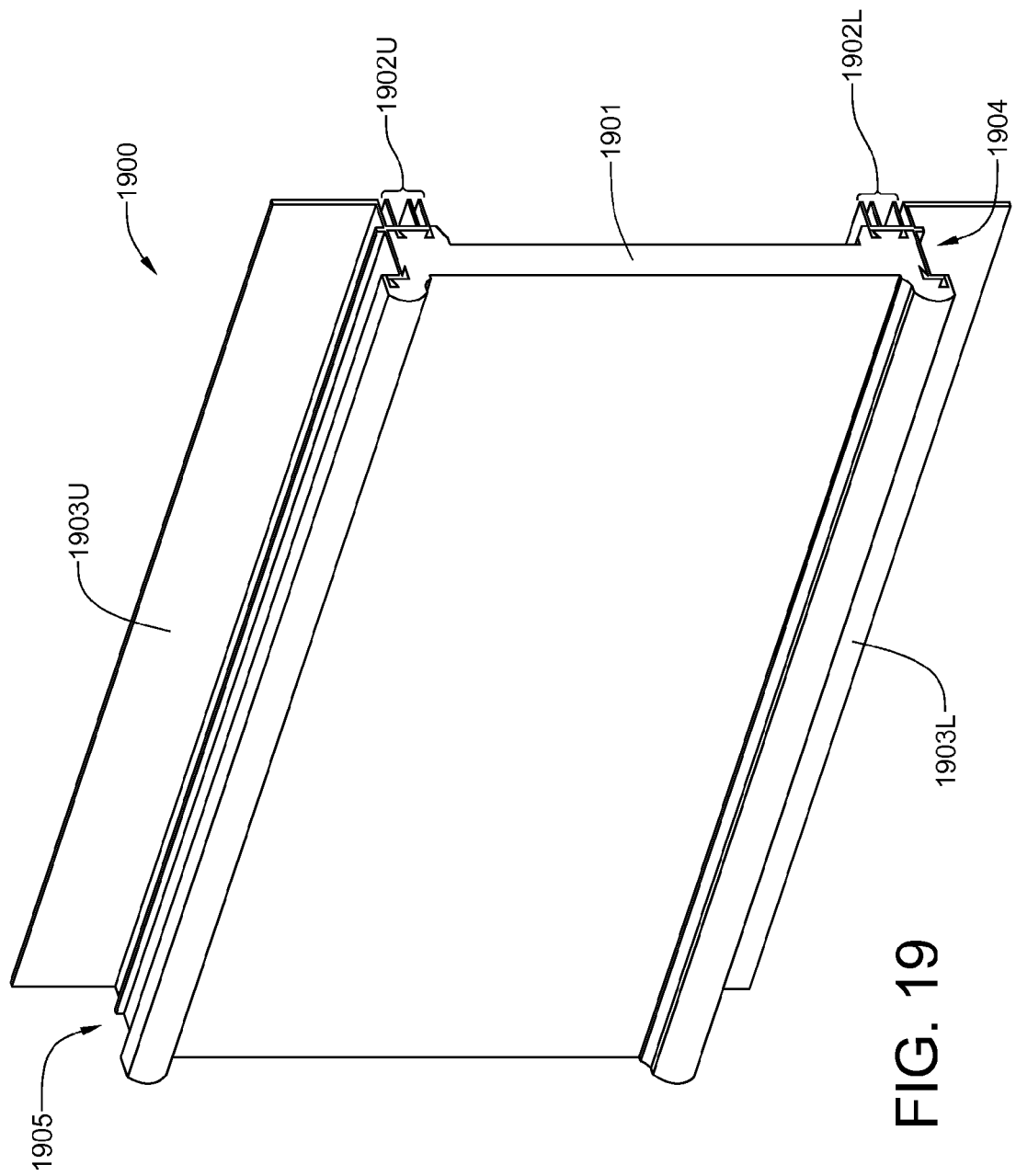
FIG. 19 is an isometric view of a co-extruded mid-wall apron used with board-and-bat siding both above it and below it.

Referring now to FIGS. 19 and 20, the co-extruded midwall apron 1900, which is designed to accommodate board-and-batten siding both above and below it, includes a composite material apron trim body 1901, upper and lower PVC standoffs 1902U and 1902L, respectively, and upper and lower PVC attachment fins 1903U and 1903L, respectively. Both attachment fins 1903U and 1903L are nailed or stapled to the wall. The cut upper ends of the board-and-batten siding of the lower course fit into the downward-facing groove 1904 at the bottom of the apron trim body 1901. Likewise, the cut lower ends of the board-and-batten siding of the upper course fit within the upward-facing groove 1905 at the top of the apron trim body 1901.

Figure 21:
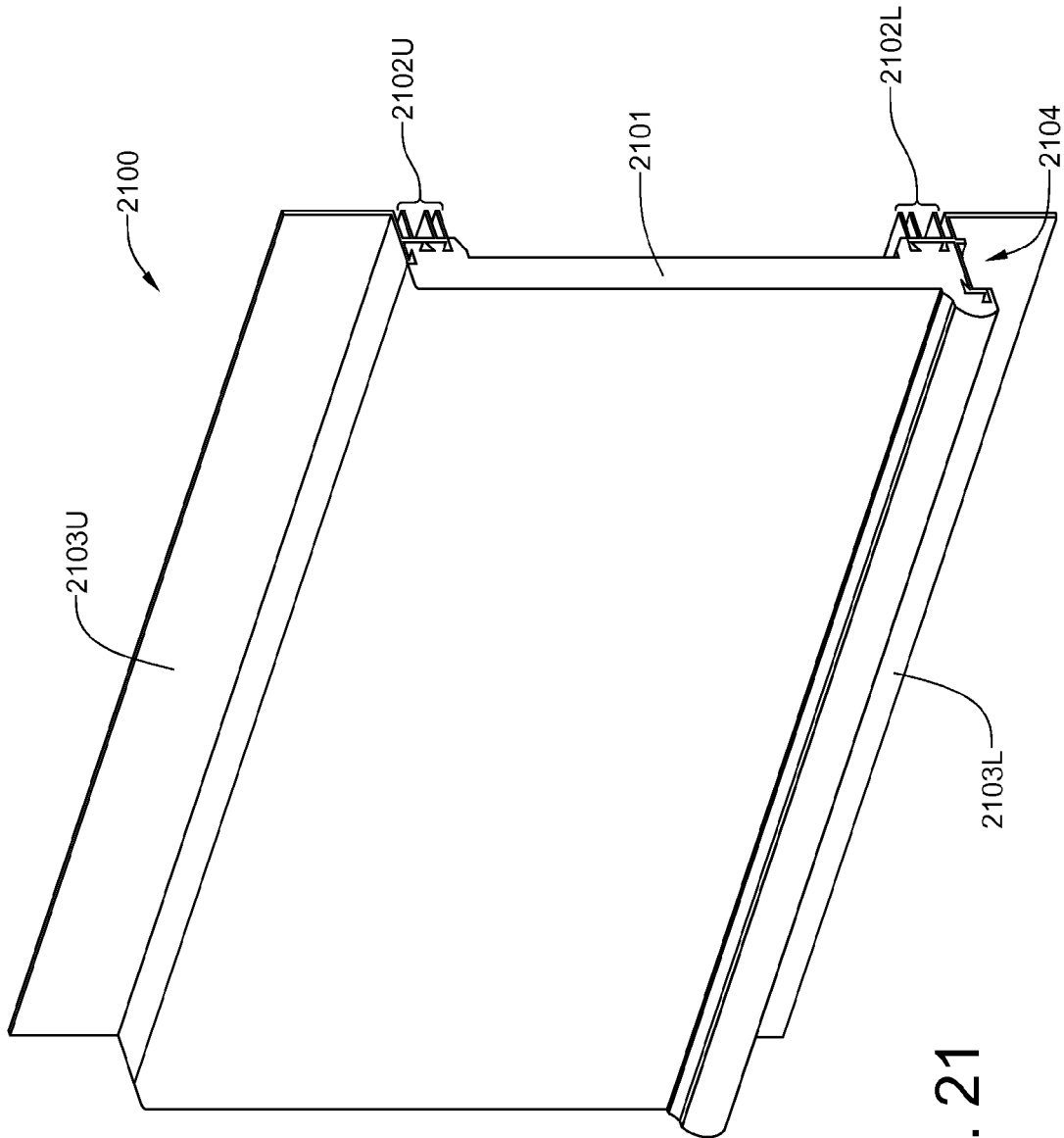
FIG. 21 is an isometric view of a co-extruded mid-wall apron used with board-and-bat siding below it and clapboard siding above it.

Referring now to FIGS. 21 and 22, the co-extruded midwall apron 2100, which is designed to accommodate board-and-batten siding below it and clapboard siding above it, includes a composite material apron trim body 2101, upper and lower PVC standoffs 2102U and 2102L, respectively, and upper and lower PVC attachment fins 2103U and 2103L, respectively. Both attachment fins 2103U and 2103L are nailed or stapled to the wall. The cut upper ends of the board-and-batten siding of the lower course fit into the downward-facing groove 2104 at the bottom of the apron trim body 2101. The first course of the clapboard siding covers the upper attachment fin 2103U.

Figure 23:
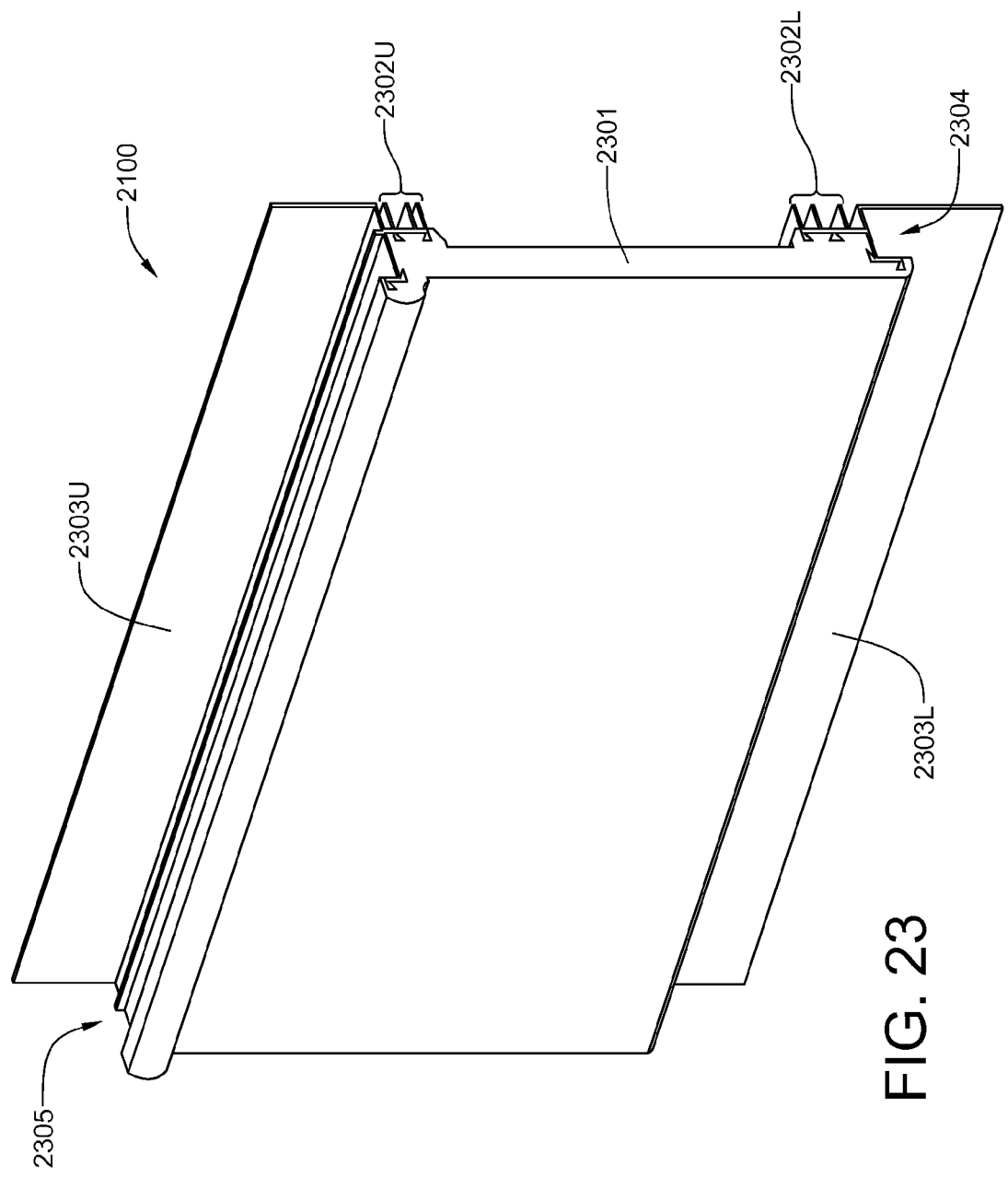
FIG. 23 is an isometric view of a co-extruded mid-wall apron used with clapboard siding below it and board-and-bat siding above it.
Figure 24:
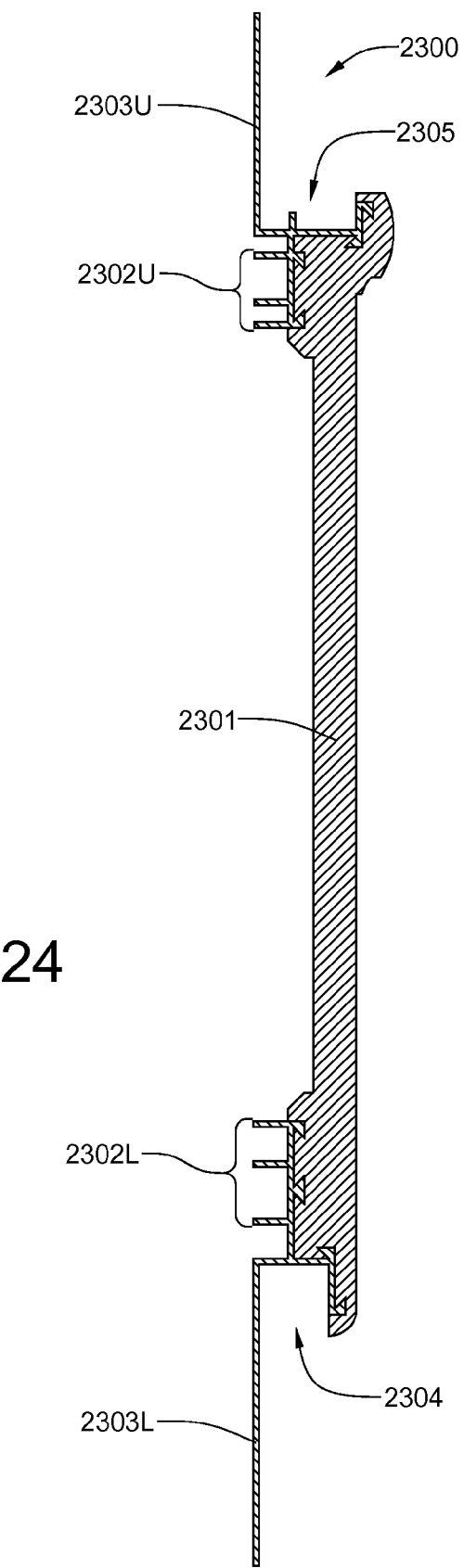
FIG. 24 is a cross-sectional view of the co-extruded mid-wall apron of FIG. 23.

Referring now to FIGS. 23 and 24, the co-extruded midwall apron 2300, which is designed to accommodate clapboard siding below it and board-and-batten siding above it, includes a wood fiber/thermoplastic resin composite material (hereinafter, "composite material") apron trim body 2301, upper and lower PVC standoffs 2302U and 2302L, respectively, and upper and lower PVC attachment fins 2303U and 2303L, respectively. Both attachment fins 2303U and 2303L are nailed or stapled to the wall. The upper edge of the last course of the clapboard siding below is covered by the downward-facing groove 2304 at the bottom of the apron trim body 2301. In addition, the cut lower ends of the board-and-batten siding of the upper course fit within the upward-facing groove 2305 at the top of the apron trim body 2301.

Figure 25:
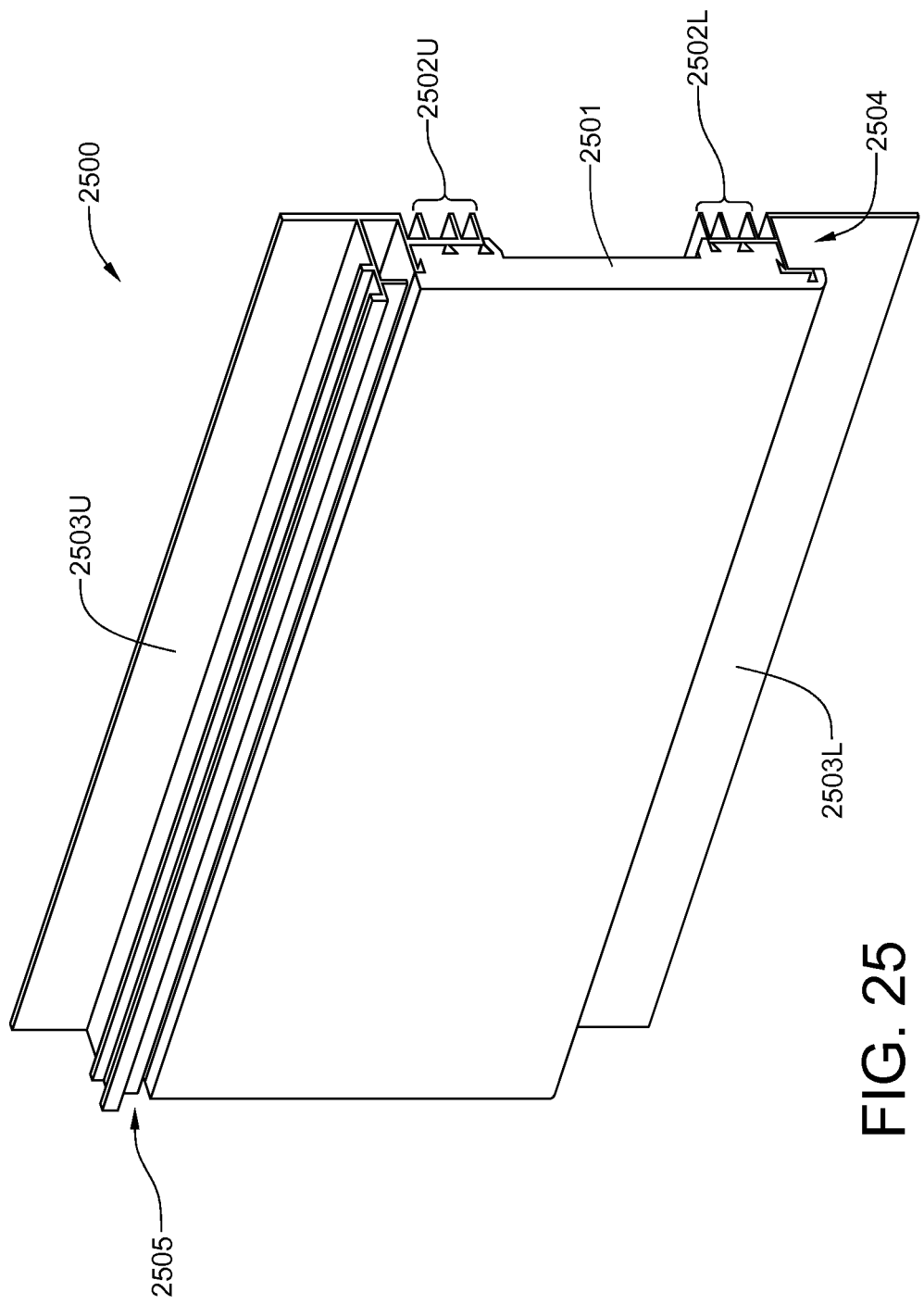
FIG. 25 is an isometric view of a co-extruded frieze board designed for horizontal use in combination with clapboard siding.

Referring now to FIGS. 25 and 26, the co-extruded frieze board 2501, which is designed to accommodate clapboard siding below it, includes a composite material frieze board body 2501, upper and lower PVC standoffs 2502U and 2502L, respectively, and upper and lower PVC attachment fins 2503U and 2503L, respectively. The upper edge of the last course of the clapboard siding below is covered by the downward-facing groove 2504 at the bottom of the frieze board trim body 2501. An outwardly-facing groove 2505 at the top of the frieze board trim body 2501 receives an edge of a soffit panel.

Figure 27:
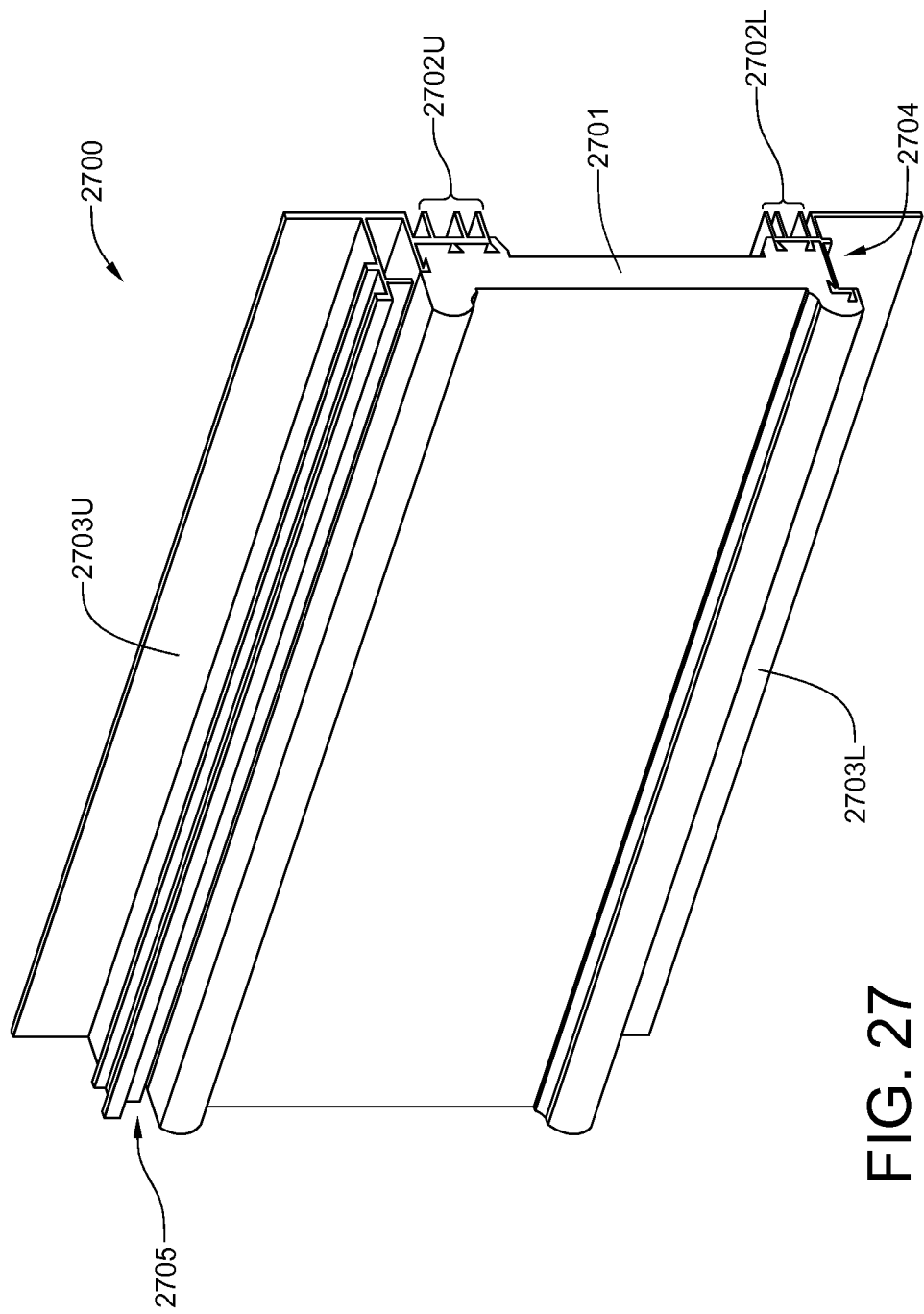
FIG. 27 is an isometric view of a co-extruded frieze board designed for horizontal use in combination with board-and-batten siding.
Figure 28:
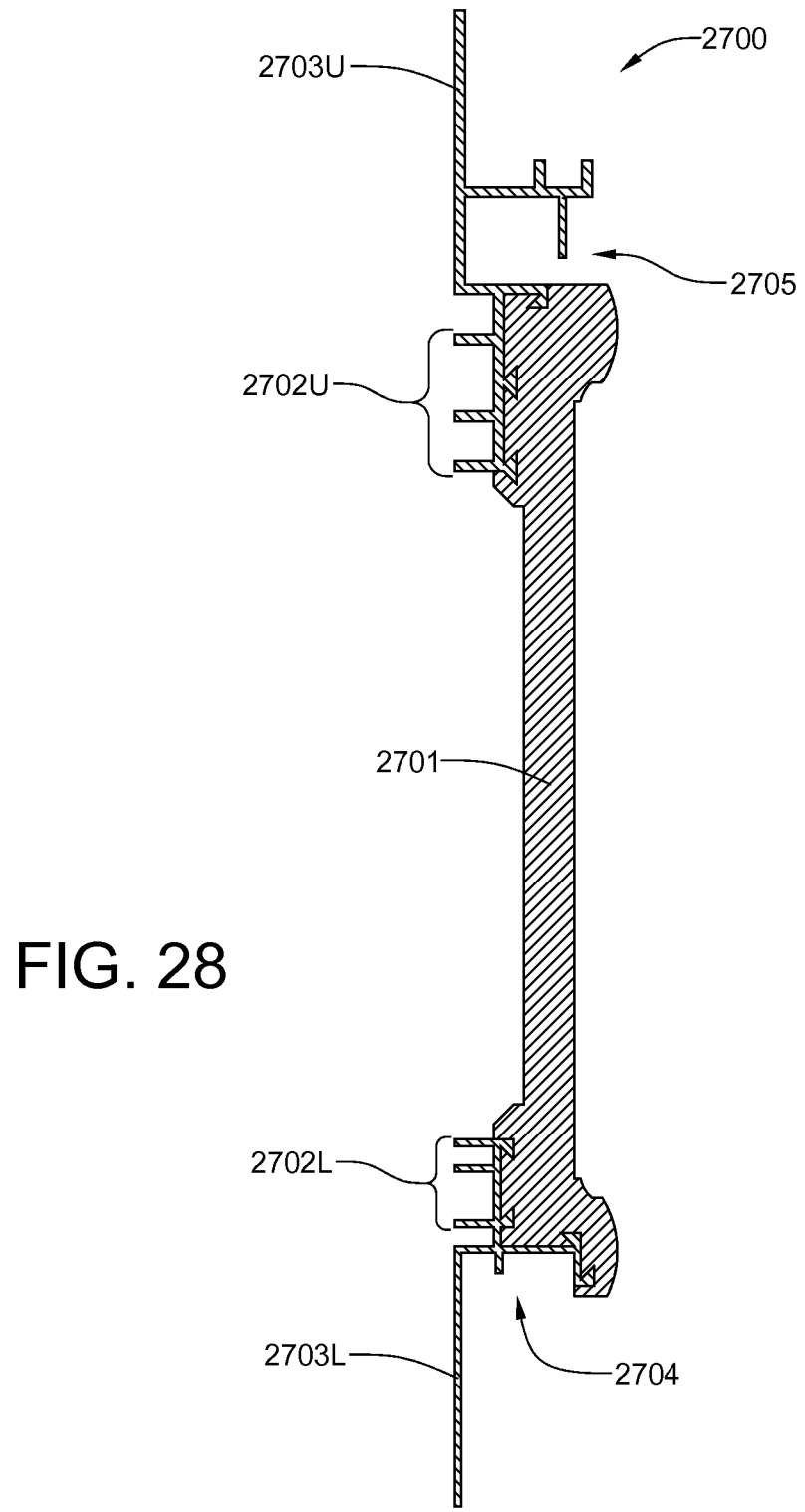
FIG. 28 is a cross-sectional view of the co-extruded frieze board of FIG. 27.

Referring now to FIGS. 27 and 28, the co-extruded frieze board 2701, which is designed to accommodate board-and-batten siding below it, includes a composite material frieze board body 271, upper and lower PVC standoffs 2702U and 2702L, respectively, and upper and lower PVC attachment fins 2703U and 2703L, respectively. The downward-facing groove 2704 at the bottom of the frieze board trim body 2701 covers the upper cut ends of the board-and-batten siding. An outwardly-facing groove 2705 at the top of the frieze board trim body 2701 receives an edge of a soffit panel.

Figure 29:
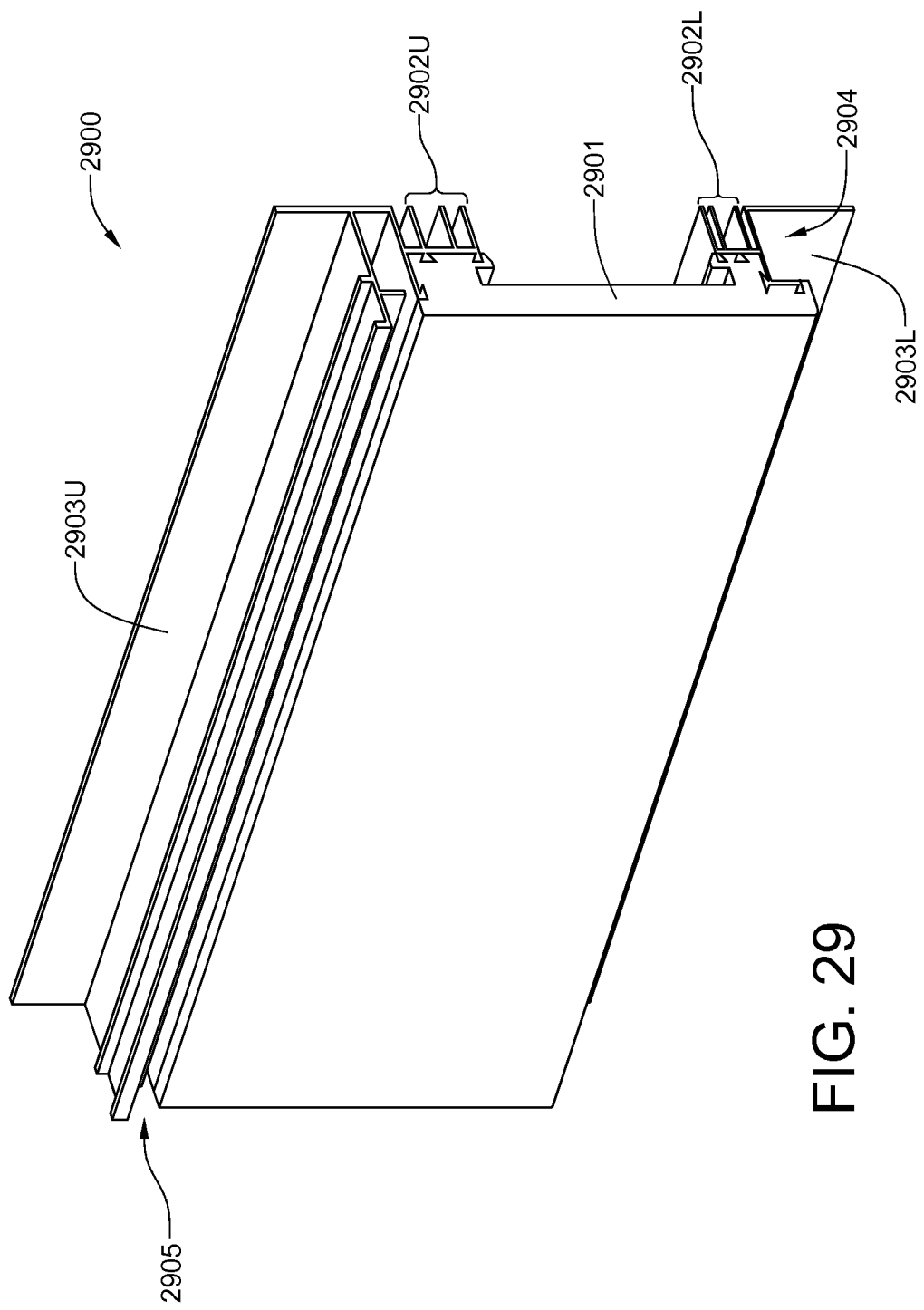
FIG. 29 is an isometric view of a co-extruded gable frieze board.
Figure 30:
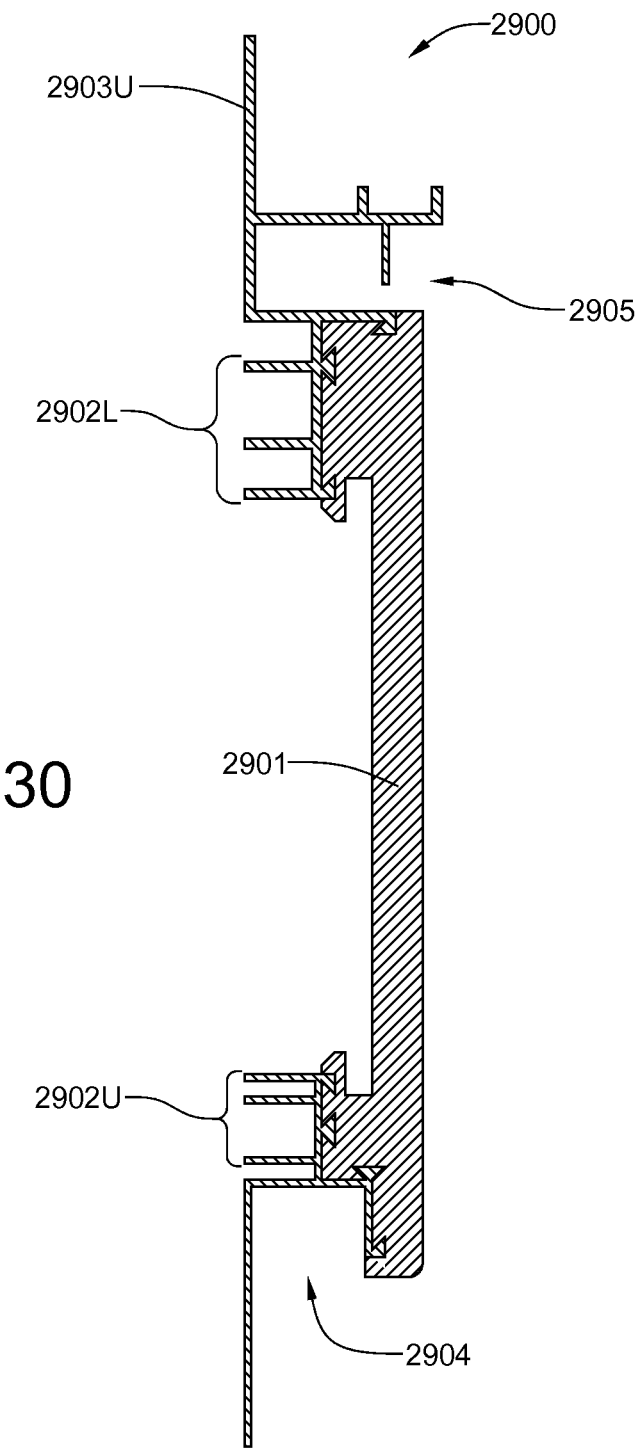
FIG. 30 is a cross-sectional view of the co-extruded gable frieze board.

Referring now to FIGS. 29 and 30, the co-extruded gable frieze board 2901, which is designed to accommodate both clapboard and board-and-batten siding below it, includes a composite material frieze board body 2901, upper and lower PVC standoffs 2902U and 2902L, respectively, and upper and lower PVC attachment fins 2903U and 2903L, respectively. The downward-facing groove 2904 at the bottom of the gable frieze trim body 2901 is sufficiently wide to cover either the upper cut ends of the board-and-batten siding or overlapping boards of clapboard siding. An outwardly-facing groove 2905 at the top of the frieze board trim body 2901 receives an edge of a soffit panel.

Figure 32:
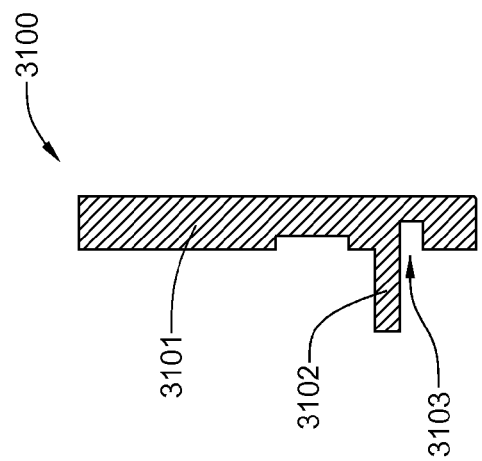
FIG. 32 is a cross-sectional view of the extruded fascia board.
Figure 31:
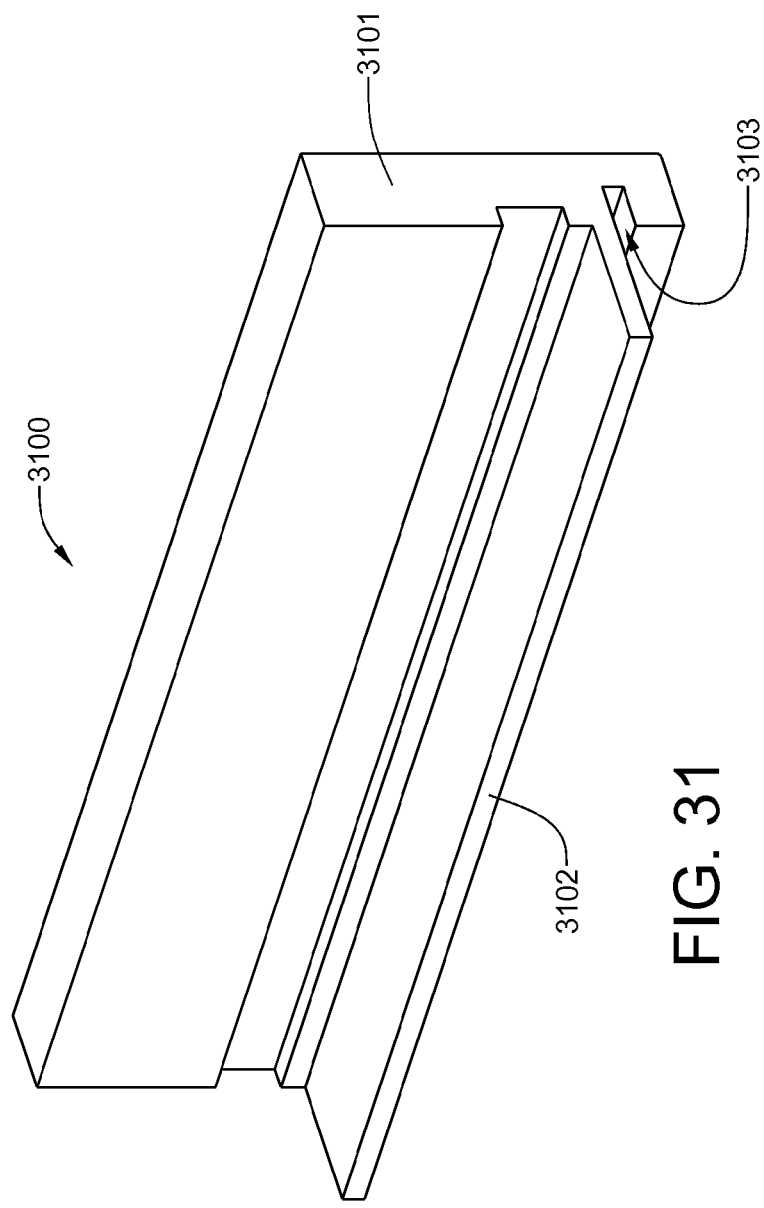
FIG. 31 is an isometric view of an extruded of fascia board.

Referring now to FIGS. 31 and 32, the extruded fascia board 3100 has only a composite material fascia board body 3101. It is the only trim component that has no PCV standoffs and fins attached. The outwardly-extending shelf 3102 is screwed to the bottom of the fascia board. The groove 3103 below the shelf 3102 receives an edge of the soffit panel (not shown). The soffit panels are preferably formed by extruding the composite material between a pair of closely spaced rollers. The material is preferably about 0.375 inch thick and is manufactured in 6-inch, 12-inch, 18-inch and 24-inch widths.

Referring now to FIGS. 33 and 34, an extruded clapboard 3300 has only a composite material body, with no PVC standoffs and fins attached. The upper edge 3302 is reduced in thickness to accommodate an attachment clip. The use of attachment clips is covered in U.S. patent application Ser. No. 12/416,762, which was filed on Apr. 1, 2009 by the same inventor. A new feature in this application is the inner lower edge has a longitudinal rib 3303, which is pulled up flush against the attachment clip of the immediately adjacent lower clapboard course, thereby eliminating the need for measurement once the first course is leveled.

Figure 35:
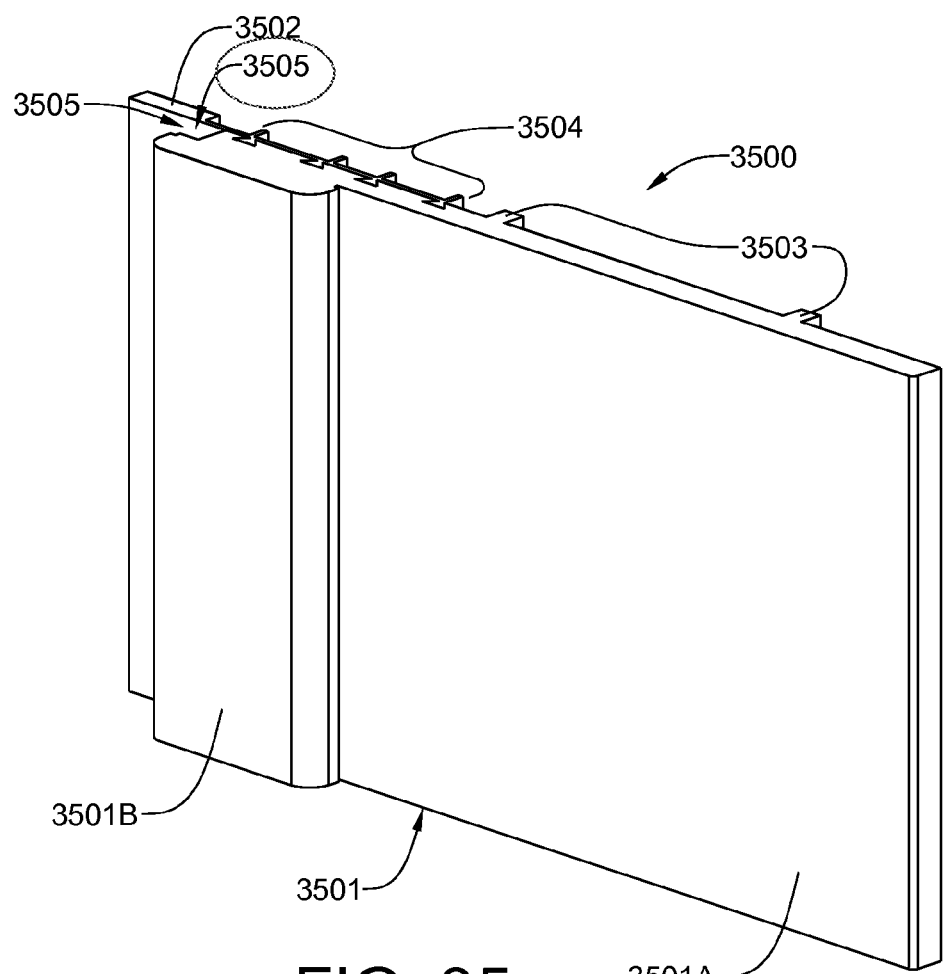
FIG. 35 is an isometric view of a co-extruded combination board and batten used for vertically-oriented board-and-batten siding with battens of rounded cross section.
Figure 36:
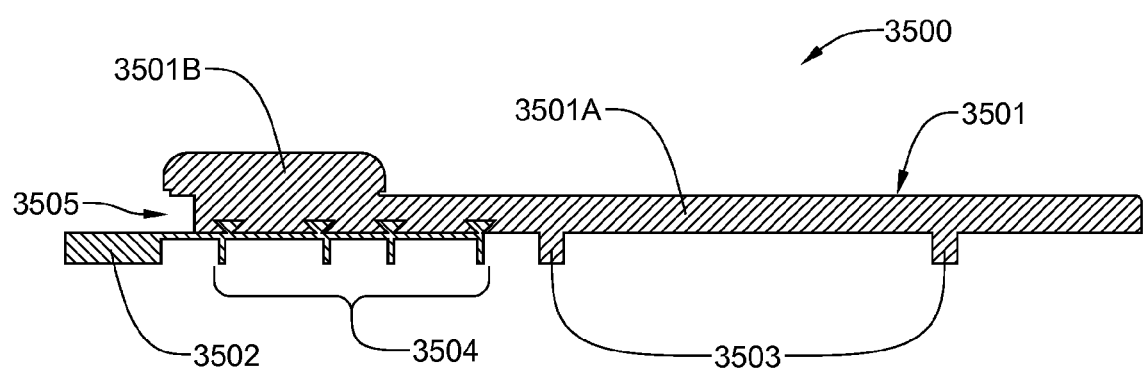
FIG. 36 is a cross-sectional view of the co-extruded combination board and batten of FIG. 35.

Referring now to FIGS. 35 and 36, a first embodiment co-extruded combination board-and-batten board 3500 is designed for rapid installation. A one-piece board-and-batten composite material body 3501 includes both a board component 3501A and a batten component 3501B. Composite material standoffs 3503 protrude from the rear of board component 3501A. The combination board-and-batten board 3500 also includes a PVC standoff structure 3504 and a single attachment fin 3502, which is attached to the underlying structure. Thus, only one edge of each board 3500 is secured directly to the substrate. The other edge is held in place by the groove 3505 beneath the simulated batten 3501B on an adjacent board. The batten component 3501A of this combination board-and-batten board 3500 has rounded edges.

Figure 37:
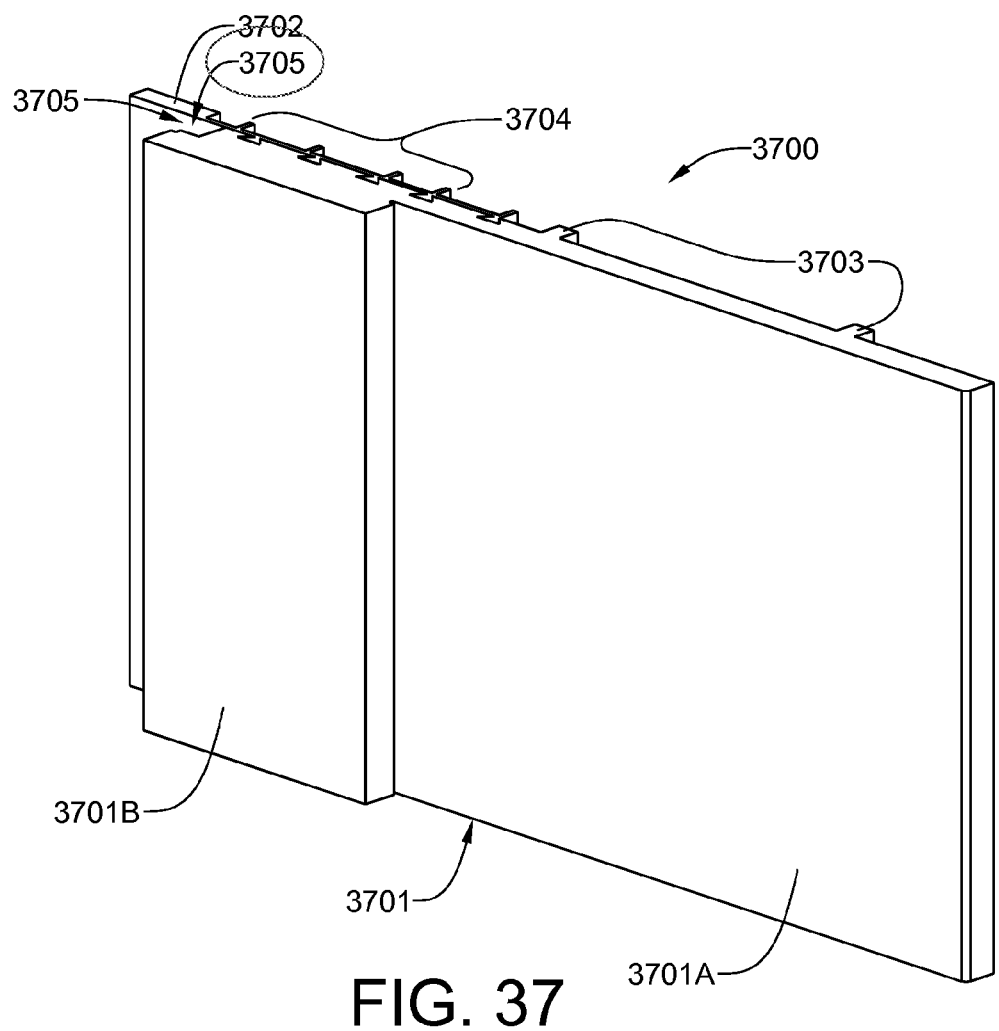
FIG. 37 is an isometric view of a co-extruded combination board and batten used for vertically-oriented board-and-batten siding with battens of squared cross section.
Figure 38:
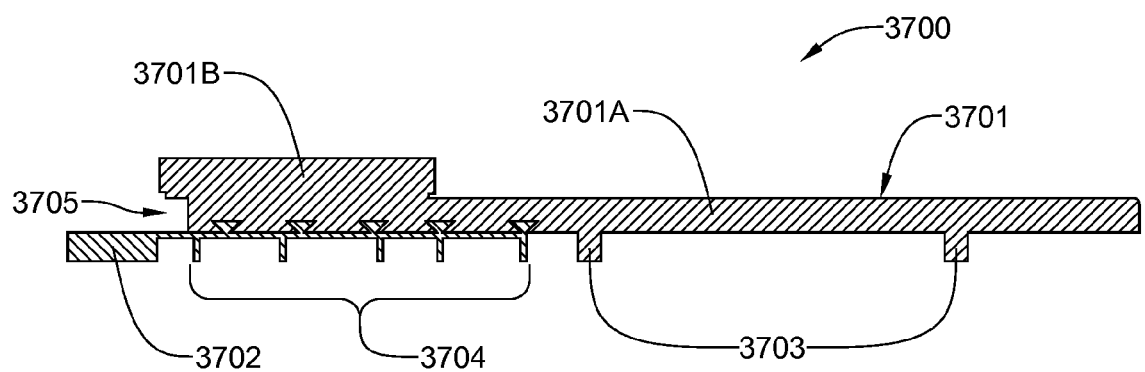
FIG. 38 is a cross-sectional view of the co-extruded combination board and batten of FIG. 37.

Referring now to FIGS. 37 and 38, a second embodiment co-extruded combination board-and-batten board 3700 is designed for rapid installation. A one-piece board-and-batten composite material body 3701 includes both a board component 3701A and a batten component 3701B. Composite material standoffs 3703 protrude from the rear of board component 3701A. The combination board-and-batten board 3700 also includes a PVC standoff structure 3704 and a single attachment fin 3702, which is attached to the underlying structure. Thus, only one edge of each board 3700 is secured directly to the substrate. The other edge is held in place by the groove 3705 beneath the simulated batten 3702 on an adjacent board. The batten component 3501A of this combination board-and-batten board 3500 has square edges.

Figure 40:
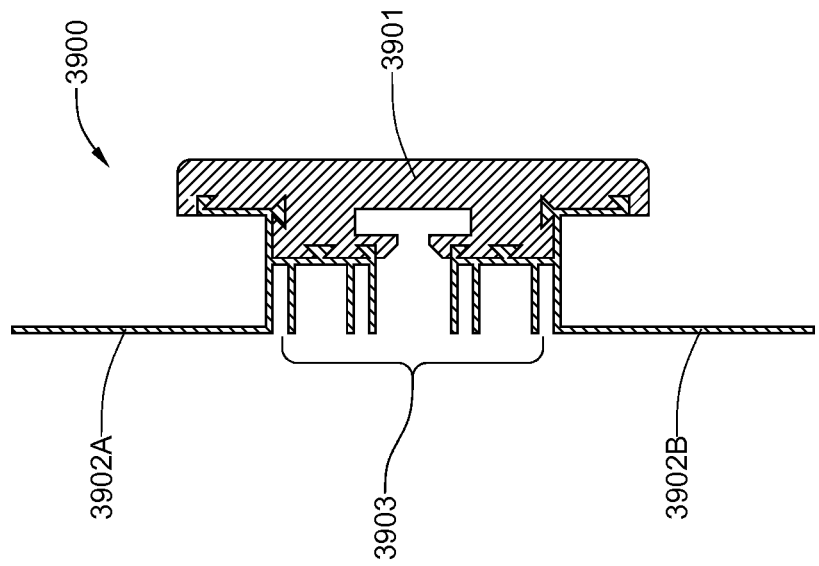
FIG. 40 is a cross-sectional view of the mullion.
Figure 39:
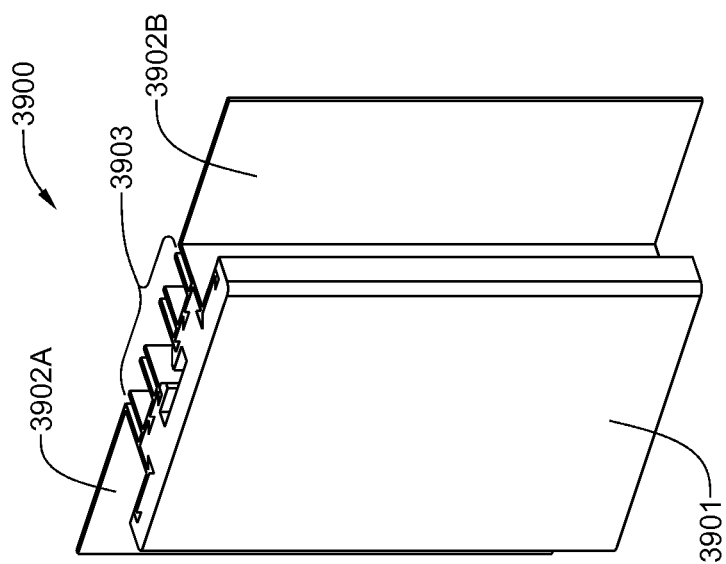
FIG. 39 is an isometric view of a mullion used to eliminate siding butt joints.

Referring now to FIGS. 39 and 40, a mullion 3900 that is used to eliminate siding butt joints includes a composite material body 3901, a pair of PVC attachment fins 3902A and 3902B, and PVC standoffs 3903.

Figure 51:
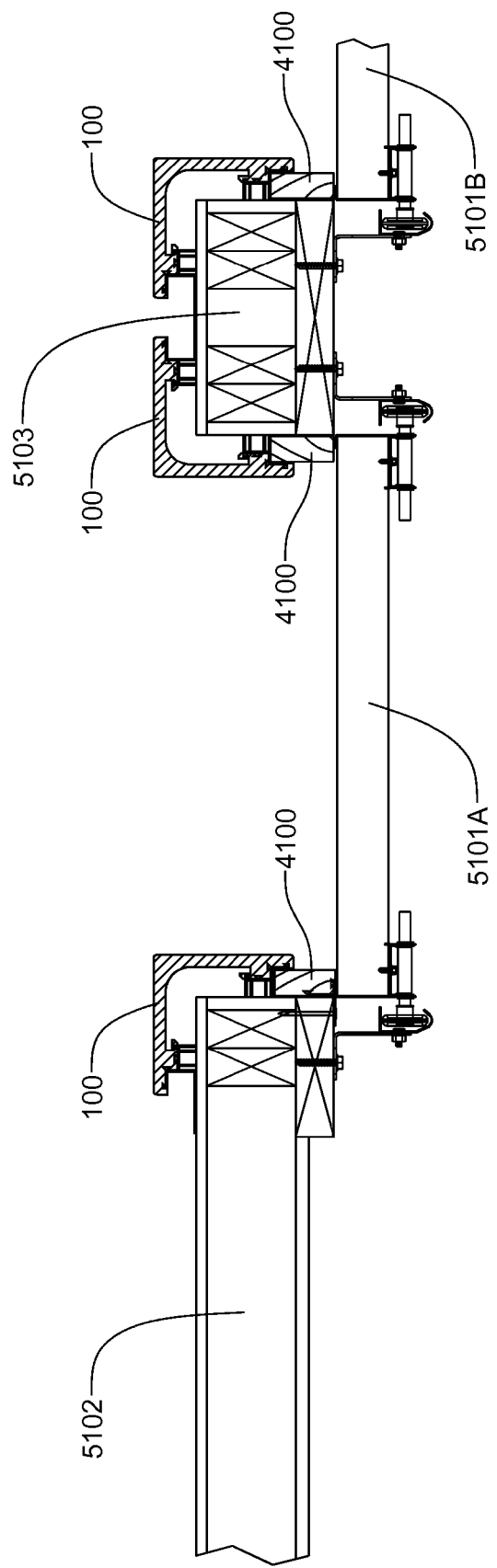
FIG. 51 is a top view of garage door in which standard corner trim pieces are used in combination with filler pieces.

Referring now to FIGS. 41 and 42, a filler piece 4100 used for the overhead door trim installation in FIG. 51 includes a composite main body 4101 and an attachment fin 4102. The edge of the main body 4101 opposite the attachment fin 4102 can be trimmed lengthwise for a proper fit.

Figure 50:
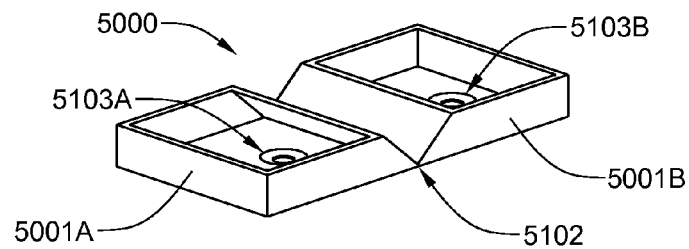
FIG. 50 is a support bracket for the custom corner.

Referring now to FIG. 43, a custom corner trim piece 4300 is a two piece mirror-image assembly that is miter cut at the line of symmetry to achieve a proper mating angle. The left piece includes a first composite main body 4301A, a first PVC attachment fin 4302A, and a first series of PVC standoffs 4303A. The right piece includes a second composite main body 4301B, a second PVC attachment fin 4302B, and a second series of PVC standoffs 4303B. The first and second composite main bodies 4301A and 4301B are held together with multiple support brackets 5000, one of which is shown in FIG. 50.

Figure 44:
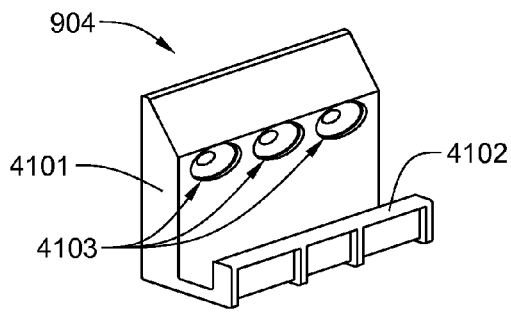
FIG. 44 is an isometric view of an apron support bracket.
Figure 45:
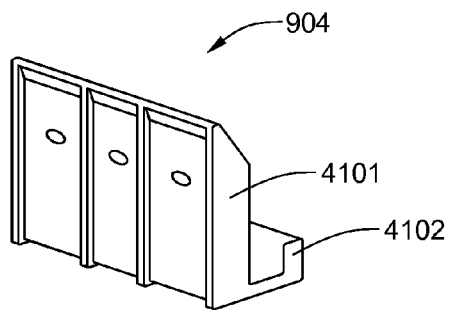
FIG. 45 is a rear view of the apron support bracket.

Referring now to FIGS. 44 and 45, an apron support bracket 904 is used to support the bottom edge of aprons 900 and 1100 shown in FIGS. 9, 10, 11 and 12. The apron support bracket 904 has a main body 4101 that is preferably injection-molded from ABS polymer resin. The main body is equipped with multiple screw holes 4103 and an upwardly-projecting lip 4102, which engages the hidden channel 905 on the lower back side of the apron trim piece 900.

Figure 46:
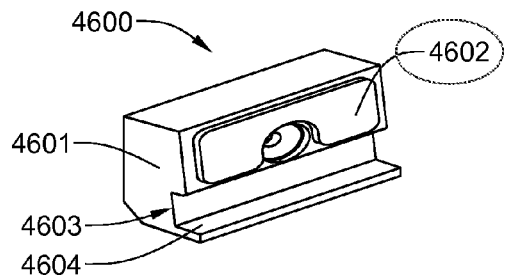
FIG. 46 is a siding starter clip with a 3M VHB adhesive pad.
Figure 47:
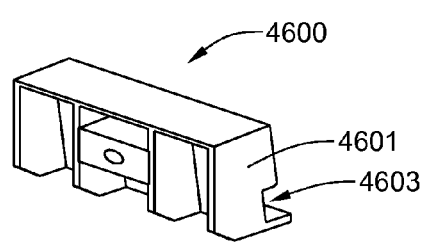
FIG. 47 is a rear view of the starter clip of FIG. 46.

Referring now to FIGS. 46 and 47, a siding starter clip 4600 is used for the first run of extruded clapboard siding 3300. The siding starter clip 4600 has a main body 4601 preferably made of injection-molded ABS polymer resin that is sufficiently wide to give the first run of siding a proper outward slant. The groove 4603 catches the longitudinal rib 3303 of an extruded clapboard 3300. A 3M VHB adhesive pad 4602 bonds to the lower edge of the extruded clapboard 3300. The siding starter clip 4600 is secured to an underlying structure with a single screw. The use of attachment clips is covered in U.S. patent application Ser. No. 12/416,762, which was filed on Apr. 1, 2009 by the same inventor.

Figure 48:
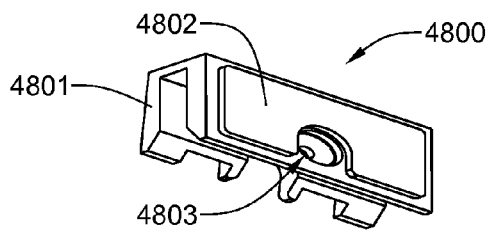
FIG. 48 is an isometric view of a siding clip with a VHB adhesive pad.
Figure 49:
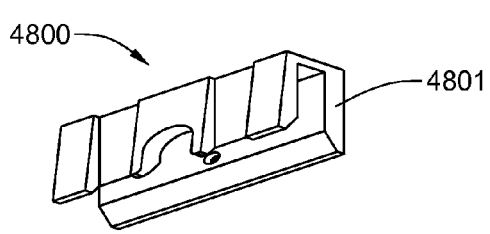
FIG. 49 is a rear view of the siding clip of FIG. 48.

Referring now to FIGS. 48 and 49, a standard siding clip 4800 is used for all but the first run of extruded clapboard siding 3300. The siding clip 4800 has a main body 4801 that is preferably made of injection-molded ABS polymer resin. A 3M VHB adhesive pad 4802 bonds to the lower edge of the extruded clapboard 3300. The siding starter clip 4600 is secured to an underlying structure with a single screw.

Referring now to FIG. 50, support bracket 5000 for the custom corner 4300 has a main body which includes first and second sections 5001A and 5001B, respectively, which are joined by a living hinge 5102. A pair of apertures 5103A and 5103B enable the support bracket 5000 to be secured with screws to opposite sides of the custom corner 4300.

Referring now to FIG. 51, is a top view of a pair of garage doors 5101A 5101B, which are installed in an opening trimmed with standard corner trim pieces 100, which are used in combination with filler pieces 4100.

Figure 52:
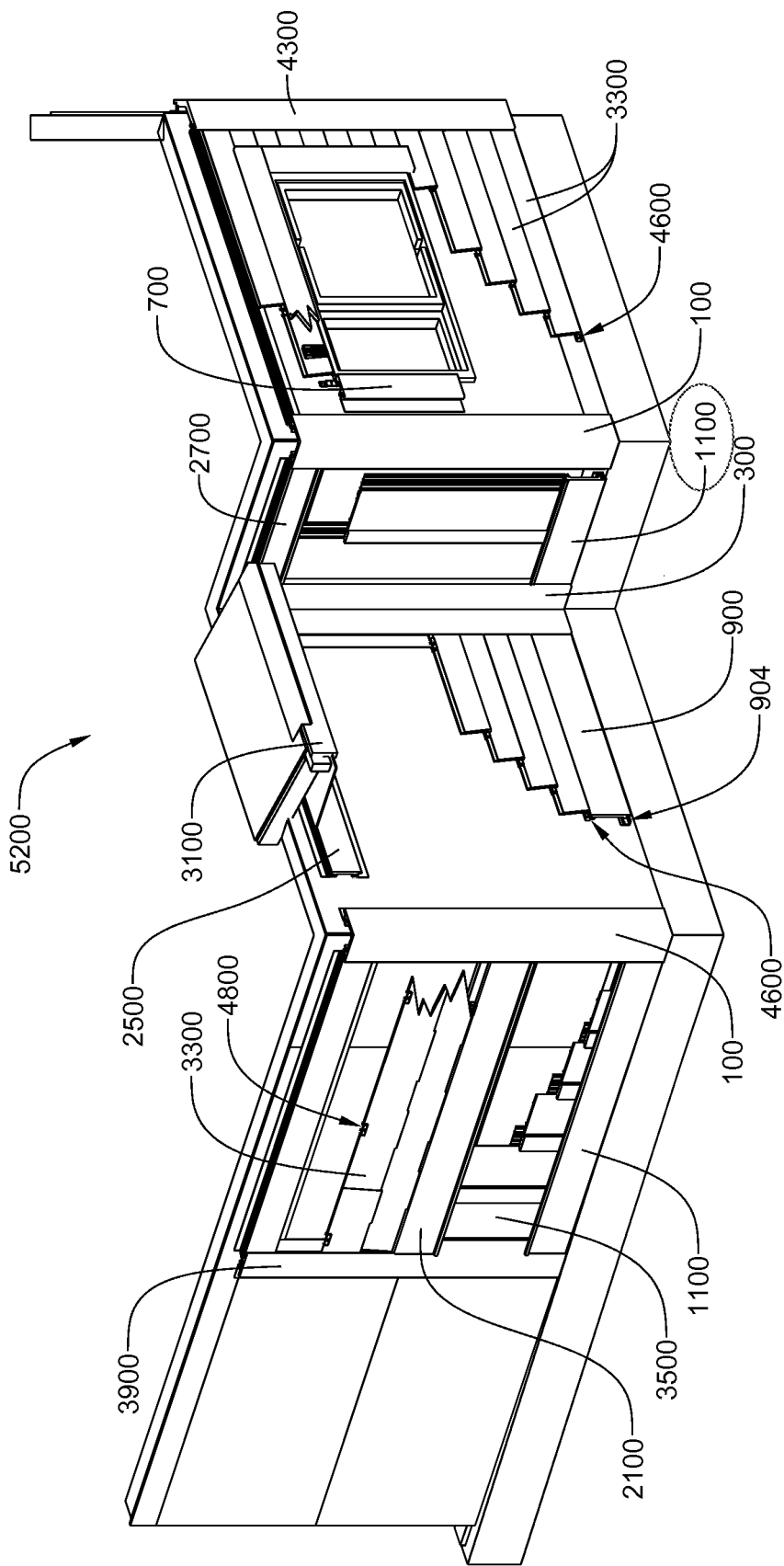
FIG. 52 is an assembly wall showing the siding and trim applied to a building.

Referring now to FIG. 52, is a structure of intersecting walls which show the siding and trim applied to a building. Siding and trim on the left-most wall will be described. A co-extruded apron trim piece 1100 is first attached to the underlying structure near the foundation. Multiple board-and-batten boards 3500 are then installed above the apron trim piece 1100. A co-extruded mid-wall apron 2100 is then installed above the board-and-batten boards 3500. Multiple extruded clapboards 3300 are then installed above the mid-wall apron 2100 using clips 4800. A mullion 3900 that is used to eliminate siding butt joints has also been installed. Construction of the center wall will now be described. A co-extruded apron trim piece 900 is installed using hanger clips 904. Multiple extruded clapboards 3300 are then installed above the apron trim piece 900 using clips 4600 and 4800. An inside corner piece 300 has been installed on the right side of the center wall. A co-extruded frieze board 2500, which is designed to accommodate clapboard siding below it, has been installed. In addition, a fascia board 3100 has been installed at the edge of the roof. A soffit panel spans the gap between the frieze board 2501 and the fascia board 3100. Construction of the narrow wall section employs coextruded board-and-batten boards 3500, which are bounded on the bottom edges by a co-extruded apron trim piece 1100 and on the upper edges by a co-extruded frieze board 2701, both of which are designed to accommodate board-and-batten siding. The right-most wall, which incorporates a window, is covered with extruded clapboards 3300, which uses the starter clips 4600 for the first run. Regular clips 4800 are used for the balance of the boards 3300. A cantilevered window trim 700 has been installed, as has been a custom corner trim 4300.

The wood plastic composite, and the PVC materials being married through heat fusion as they are co-extruded simultaneously. They are two completely different materials, co-extruded together. Resulting in an individual part being one piece, two different materials. The two different materials are necessary for the performance of the Part, both structurally and for expansion and contraction "reaction memory". The wood plastic composite or body will be sand blasted to allow for maximum paint adhesion both textured and smooth finishes (Note: The PVC extrusion has a soffit receiver similar to the opposing frieze board. They level line across from one another. The bottom PVC extrusion is for receiving the opposing end of the soffit panel by first inserting the soffit panel into the frieze board. Then just like a zip loc bag, you simply hem the fascia board into place locking in the soffit panel. Then by inserting a blind nail at the top of the frieze board, about 1" from the top. The roofing drip edge will cover the nail head. Then nail or screw through the soffit panel, through the extrusion at 32" O.C. All of the parts have stand offs on the backside of the PVC extrusions and ABS injections. That will hold the wood composite material off of the substrate, or structures, plywood or sheer panels act. Thus creating air flow between the back side of the Trim System, and the actual structure. (Air movement or air flow in between structure and The Trim System). Meaning the only contact between the Trim System, and the actual structure. Would be the points of contact, of the PVC extrusions, and the points of contact between the ABS Injection parts. There is no where that water can stand and wick into the wood plastic composite. Water is ejected by mother nature/gravity due to the stand off's, giving it no place to be trapped in the wall. Secure/nail through the PVC nail fins. Meaning no face nailing or no nailing through the wood plastic composite material. Screws attach ABS injection parts accordingly. (Note: Trim System aprons, frieze boards, board & batten all tuck into the inside and outside corners, with the exception of the gable frieze board).

The heretofore described trim and siding system adds:

Superior Curb Appeal: no face nailing except finish nails in one side of door casing.

Face Nail Free: no nail head blemishes, no need for paint prepping. Except finish nails heads in one side of door casing.

94% Less Caulk: there is really no need for caulk structurally.

Dry-rot And Mold Free: a known fact to cause severe illness due to water entrapment.

Expansion and Contraction: allows for extreme expansion and contraction with no structural or cosmetic damage.

Air Movement: air movement between substrate/house wrap and veneer allowing for natural air movement to dry up any moisture.

Ease Of installation: Installs significantly faster do to the fact that you are installing assembled parts, verses field assembling flat 4/4 material.

Meets And Exceeds All National Code Compliance

With Stands Winds Of Over 200 mph

Light Weight: compliments the installation process

50 Year Warrantee

Significantly Over All Cost Savings

30 Percent less nailing required

Tremendous Reduction Of liability

What is claimed is:

1. A trim piece for use with lapboard siding comprising:
a main body made from a mixture of cellulose fiber and thermoplastic resin; and
a polyvinyl chloride (PVC) resin component including at least one standoff and at least one attachment fin, wherein said polyvinyl chloride resin component and said main body are molecularly fused by heat in a co-extrusion process;
wherein a heat-fused interface between the main body and said PVC resin component provides molecular bonding between said PVC resin component and the main body, as well as mechanical attachment of said PVC resin component to the main body via PVC ribs of generally triangular cross section, which project from said PVC resin component, and are embedded within the main body.

2. The trim piece of claim 1, wherein said at least one standoff and said at least one attachment fin enable said trim piece to be attached to an underlying structure with the main body spaced away from an adjacent surface of the underlying structure.

3. The trim piece of claim 1, wherein neither said at least one standoff nor said at least one attachment fin can be removed from the main body without tearing the projected PVC ribs from their associated PVC component.

4. The trim piece of claim 1, wherein said at least one standoff and said at least one attachment fin are sufficiently flexible so that the main body can move so as to accommodate thermal expansion of siding boards that are installed in combination with said trim piece.

5. The trim piece of claim 1, wherein said at least one attachment fin provides for attachment of the trim piece to an underlying structure with penetrating fasteners that are covered by subsequently-installed siding boards.

6. The trim piece of claim 1, wherein said at least one attachment fin provides for attachment of the trim piece to an underlying structure without the need for penetrating fasteners passing through the main body.

7. The trim piece of claim 1, adapted as a vertical window trim piece, which further comprises a bracket mechanically attached to each end of the main body, said vertical window trim piece being attachable to an underlying structure via said brackets and said attachment fin, with an edge of said vertical window trim piece being cantilevered between said brackets.

8. A trim piece for use with lapboard siding comprising:
a main body made from a mixture of cellulose fiber and thermoplastic resin; and
a polyvinyl chloride (PVC) resin component including at least one standoff and at least one attachment fin, wherein said polyvinyl chloride resin component and said main body are molecularly and mechanically joined in a co-extrusion process,
wherein a heat-fused interface between the main body and said PVC resin component provides molecular bonding between said PVC resin component and the main body, as well as mechanical attachment of said PVC resin component to the main body via PVC ribs of generally triangular cross section, which project from said PVC resin component, and which are embedded within the main body.

9. The trim piece of claim 8, wherein neither said at least one standoff nor said at least one attachment fin can be removed from the main body without tearing the projected PVC ribs from their associated PVC component.

10. The trim piece of claim 8, wherein said at least one standoff and said at least one attachment fin are sufficiently flexible so that the main body can move so as to accommodate thermal expansion of siding boards that are installed in combination with said trim piece.

11. The trim piece of claim 8, wherein said at least one attachment fin provides for attachment of the trim piece to an underlying structure with penetrating fasteners that are covered with subsequently-installed siding boards.

12. The trim piece of claim 8, wherein said at least one attachment fin provides for attachment of the trim piece to an underlying structure without the need for penetrating fasteners passing through the main body.

13. The trim piece of claim 8, adapted as a vertical window trim piece, which further comprises a bracket mechanically attached to each end of the main body, said vertical window trim piece being attachable to an underlying structure via said brackets and said attachment fin, with an edge of said vertical window trim piece being cantilevered between said brackets.

* * * * *